United States Patent
Takahashi et al.

(10) Patent No.: US 12,153,018 B2
(45) Date of Patent: Nov. 26, 2024

(54) PROCESSING SYSTEM, PROCESSING METHOD, AND STORAGE MEDIUM

(71) Applicant: KABUSHIKI KAISHA TOSHIBA, Tokyo (JP)

(72) Inventors: Hiromasa Takahashi, Minato (JP); Masahiro Saito, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 286 days.

(21) Appl. No.: 17/660,275

(22) Filed: Apr. 22, 2022

(65) Prior Publication Data
US 2022/0244220 A1    Aug. 4, 2022

Related U.S. Application Data

(63) Continuation of application No. PCT/JP2020/039474, filed on Oct. 21, 2020.

(30) Foreign Application Priority Data

Oct. 30, 2019  (JP) .................................. 2019-197979

(51) Int. Cl.
*G01N 29/04*    (2006.01)
*G01N 29/24*    (2006.01)
*G01N 29/34*    (2006.01)

(52) U.S. Cl.
CPC ....... *G01N 29/041* (2013.01); *G01N 29/2431* (2013.01); *G01N 29/34* (2013.01); *G01N 2291/267* (2013.01)

(58) Field of Classification Search
CPC ...... G01N 29/00; G01N 29/04; G01N 29/041; G01N 29/07; G01N 29/24; G01N 29/2431; G01N 29/34; G01N 2291/267
See application file for complete search history.

(56) References Cited

U.S. PATENT DOCUMENTS

2007/0038400 A1   2/2007 Lee et al.
2012/0243771 A1   9/2012 Matsumoto et al.
(Continued)

FOREIGN PATENT DOCUMENTS

JP       6-265529 A       9/1994
JP       2007278809 A  * 10/2007 ............. G01N 29/10
(Continued)

OTHER PUBLICATIONS

Machine Translation of JP 2007278809 A (Year 2007).*
(Continued)

*Primary Examiner* — Nguyen Q. Ha
(74) *Attorney, Agent, or Firm* — Oblon, McClelland, Maier & Neustadt, L.L.P.

(57) ABSTRACT

A processing system according to an embodiment includes a processing device. The processing device receives a detection result of a reflected wave from a detector that includes multiple detection elements arranged in a first direction and a second direction crossing each other, and performs a probe that includes transmitting an ultrasonic wave toward a welding object and detecting the reflected wave. The processing device performs a first determination of determining a joint and a non-joint at multiple points along the first and second directions of the welding object based on the detection result. The processing device performs a second determination of determining an appropriateness of a result of the first determination based on the detection result or the result of the first determination.

16 Claims, 24 Drawing Sheets

(56) References Cited

U.S. PATENT DOCUMENTS

2019/0242854 A1 8/2019 Matsui et al.
2020/0003735 A1 1/2020 Ushijima et al.

FOREIGN PATENT DOCUMENTS

| JP | 2011-117877 A | 6/2011 |
| JP | 2019-90727 A | 6/2019 |
| KR | 10-2019-0051672 A | 5/2019 |
| KR | 10-1995418 B1 | 7/2019 |
| WO | WO 2019/098232 A1 | 5/2019 |

OTHER PUBLICATIONS

International Search Report issued Dec. 28, 2020 in PCT/JP2020/039474 filed Oct. 21, 2020 2 pages.

Ushijima et al., "Spot Welding Inspection Robot Achieving Labor Saving and Improvement of Reliability Using 3D Ultrasonic Inspection Equipment", Toshiba Review, vol. 74, No. 4, 2019 (9 pages)(with Machine Generated English Translation).

Abe et al., "MatrixeyeTM Portable 3D Ultrasonic Inspection System", Toshiba Review, vol. 60, No. 4, 2005 (10 pages) (with Machine Generated English Translation).

Karasawa et al., "Self-Propelled Ultrasonic Testing System for Steel Plate Deck Bridges Applying Matrixeye Tm 3D-SAFT Array Inspection Equipment", Toshiba Review, vol. 70, No. 9, 2015 (13 pages) (with Machine Generated Additional References sheet(s) attached English Translation).

* cited by examiner

⋮

PROCESSING SYSTEM, PROCESSING METHOD, AND STORAGE MEDIUM

CROSS-REFERENCE TO RELATED APPLICATIONS

This is a continuation application of International Patent Application PCT/JP2020/039474, filed on Oct. 21, 2020. This application also claims priority to Japanese Patent Application No. 2019-197979, filed on Oct. 30, 2019. The entire contents of which are incorporated herein by reference.

FIELD

Embodiments described herein relate to a processing system, a processing method, and a storage medium.

BACKGROUND

In welding, portions of two or more members are joined to each other by melting. The welded members are inspected for whether or not the welded portion (hereinbelow, called the weld portion) is appropriately joined. For example, in a non-destructive inspection, a human (an inspector) that grips a detector causes the detector to contact the weld portion. An ultrasonic wave is transmitted from the detector toward the weld portion, and data related to the welding object is derived based on the reflected waves. Technology that can increase the accuracy of the data related to the welding object of the non-destructive inspection is desirable.

DETAILED DESCRIPTION

Figure 1:
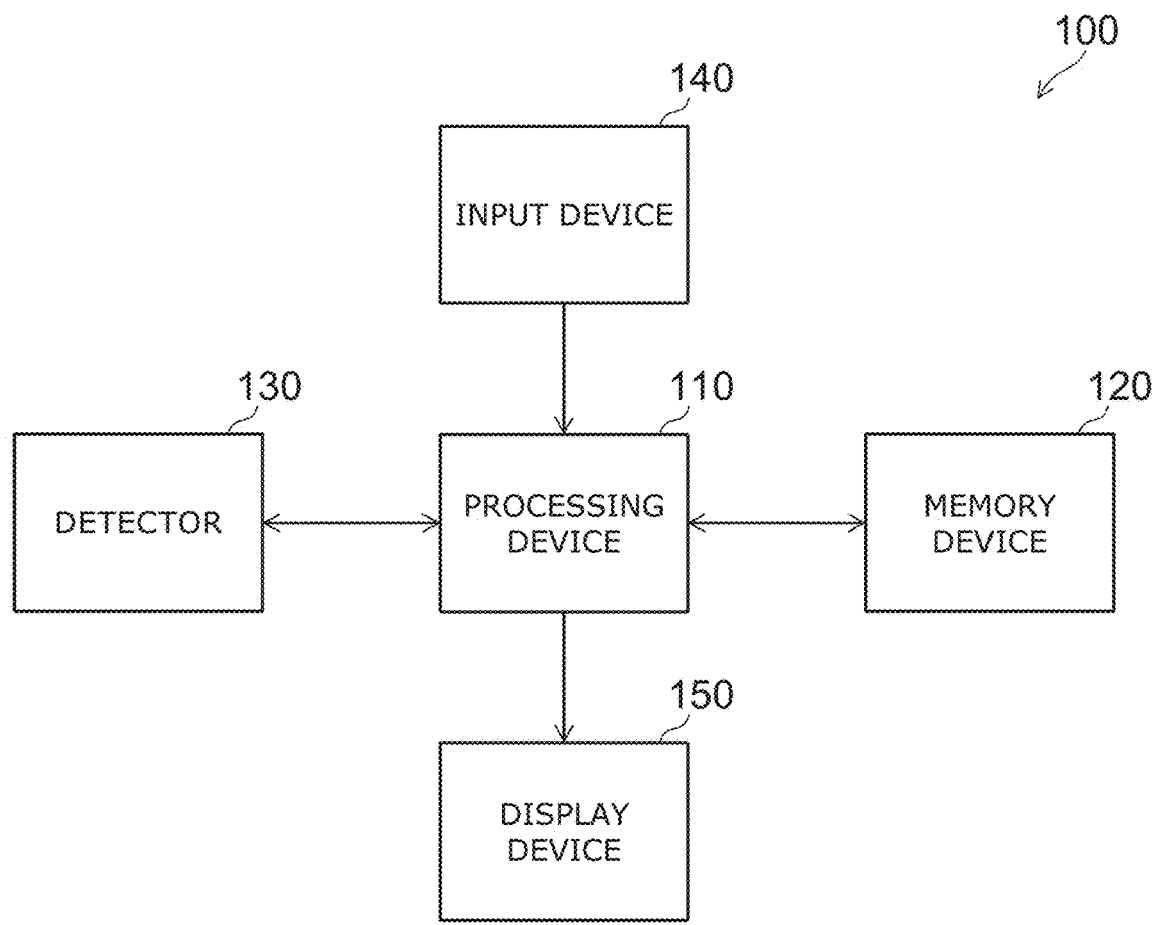
FIG. 1 is a block diagram illustrating a configuration of a processing system according to an embodiment.

A processing system according to an embodiment includes a processing device. The processing device receives a detection result of a reflected wave from a detector that includes multiple detection elements arranged in a first direction and a second direction crossing each other, and performs a probe that includes transmitting an ultrasonic wave toward a welding object and detecting the reflected wave. The processing device performs a first determination of determining a joint and a non-joint at multiple points along the first and second directions of the welding object based on the detection result. The processing device performs a second determination of determining an appropriateness of a result of the first determination based on the detection result or the result of the first determination.

Embodiments of the invention will now be described with reference to the drawings.

The drawings are schematic or conceptual; and the relationships between the thickness and width of portions, the proportions of sizes among portions, etc., are not necessarily the same as the actual values. The dimensions and proportions may be illustrated differently among drawings, even when the same portion is illustrated.

In the specification and drawings, components similar to those already described are marked with the same reference numerals; and a detailed description is omitted as appropriate.

FIG. 1 is a block diagram illustrating a configuration of a processing system according to an embodiment.

As illustrated in FIG. 1, the processing system 100 according to the embodiment includes a processing device 110 and a memory device 120. The memory device 120 stores data related to a weld inspection. The processing device 110 processes the data related to the weld inspection.

The processing system 100 illustrated in FIG. 1 further includes a detector 130, an input device 140, and a display device 150. The detector 130 transmits an ultrasonic wave toward an object and detects (receives) the reflected wave. The detector 130 includes, for example, a probe. Hereinafter, the transmission of the ultrasonic wave and the detection of the reflected wave by the detector 130 are called a probe (probing).

The processing device 110 performs various processing based on the detected reflected wave. The processing device 110 causes the display device 150 to display a user interface. The user can easily check data obtained by the processing via the user interface displayed by the display device 150. The user can input data to the processing device 110 via the user interface by using the input device 140.

The processing device 110 is connected to the memory device 120, the detector 130, the input device 140, and the display device 150 via wired communication, wireless communication, or a network.

Here, the weld inspection will be described in detail. A non-destructive inspection of the weld portion is performed in the weld inspection.

Figure 2:
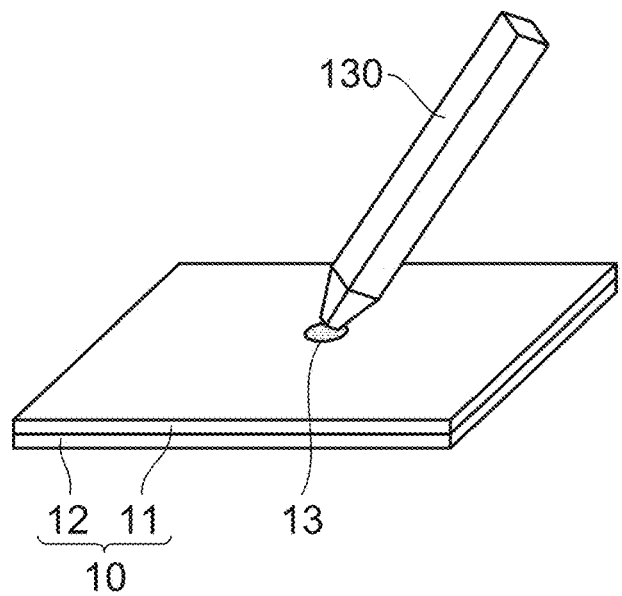
FIG. 2 is a schematic view illustrating a state of a non-destructive inspection.

FIG. 2 is a schematic view illustrating a state of the non-destructive inspection.

The detector 130 includes multiple detection elements for inspecting the weld portion. For example, the detector 130 has a configuration that can be gripped by the hand of a human as illustrated in FIG. 2. The human that grips the detector 130 inspects a weld portion 13 by causing the tip of the detector 130 to contact the weld portion 13. Here, an example will be described in which a human grips the detector 130 and performs a weld inspection. Hereinafter, the human (e.g., the inspector) that grips the detector 130 and performs the weld inspection is called the user.

Figure 3:
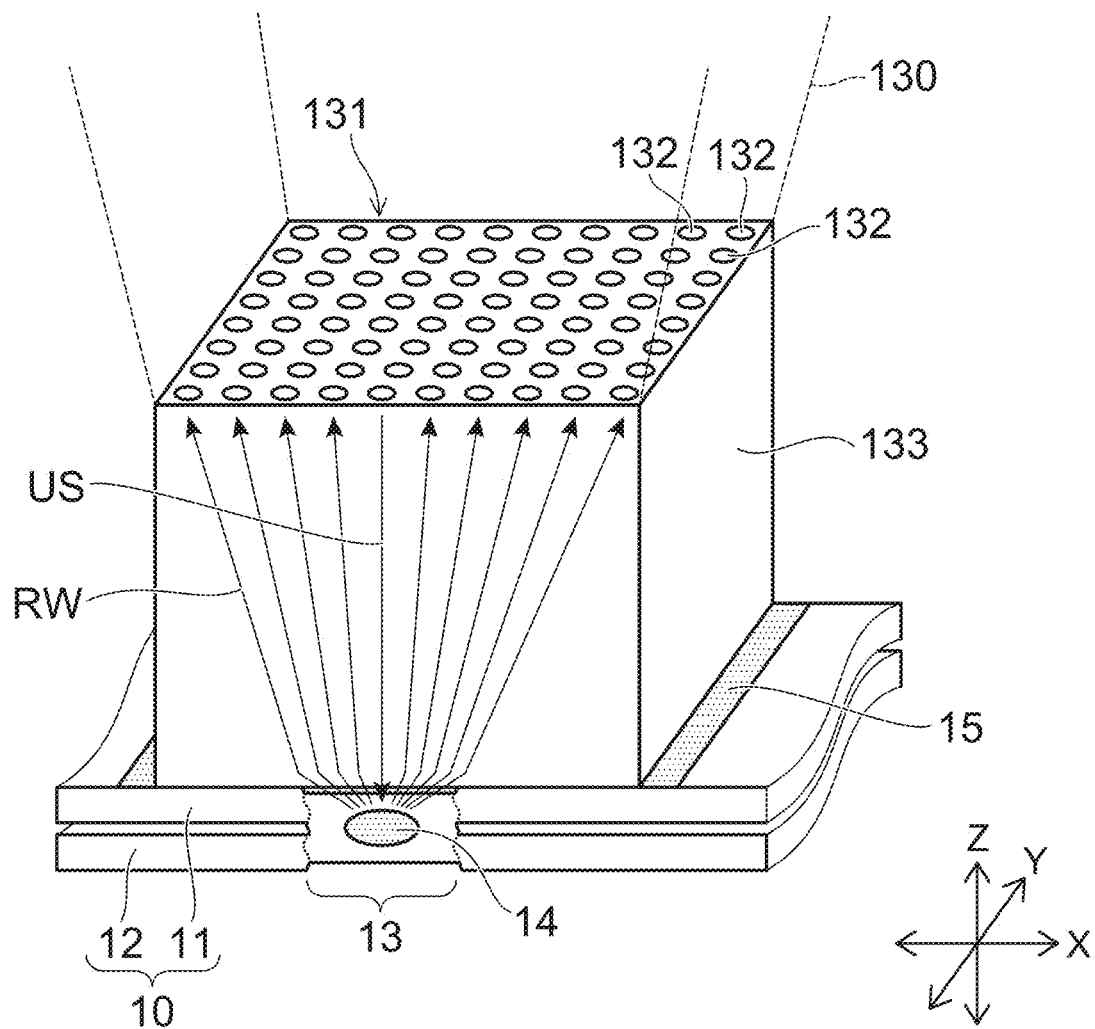
FIG. 3 is a schematic view illustrating the internal structure of a detector tip.

FIG. 3 is a schematic view illustrating the internal structure of the detector tip.

As illustrated in FIG. 3, an element array 131 that includes multiple detection elements 132 is located inside the detector 130 tip. The detection elements 132 are, for example, transducers. For example, each detection element 132 emits an ultrasonic wave of a frequency of not less than 1 MHz and not more than 100 MHz. The multiple detection elements 132 are arranged in a first direction and a second direction that cross each other. In the example illustrated in FIG. 3, the multiple detection elements 132 are arranged in an X-direction and a Y-direction that are orthogonal to each other.

For example, the element array 131 is covered with a hard propagating member 133. The hard propagating member 133 is positioned between the element array 131 and the weld portion 13 when the tip of the detector 130 is caused to contact the weld portion 13. The hard propagating member 133 includes a resin material or the like through which an ultrasonic wave easily propagates. By providing the hard propagating member 133 that corresponds to the shape of the surface of the weld portion 13, the ultrasonic wave easily propagates into the interior of the weld portion 13. Deformation, damage, etc., of the element array 131 can be suppressed by the hard propagating member 133 when the detector 130 contacts the weld portion 13. The hard propagating member 133 has a hardness sufficient to suppress the deformation, the damage, etc., when contacting the weld portion 13.

FIGS. 2 and 3 illustrate a state of inspecting a member 10 as the welding object. The member 10 is made by spot-welding a metal plate 11 (a first member) and a metal plate 12 (a second member) at the weld portion 13. As illustrated in FIG. 3, a solidified portion 14 is formed at the weld portion 13 by a portion of the metal plate 11 and a portion of the metal plate 12 melting, mixing, and solidifying.

For example, in the inspection, it is verified whether or not the weld portion 13 is formed. In the inspection, it is verified the diameter of the weld portion 13, whether or not the diameter is sufficient, etc. A couplant 15 is coated onto the surface of the object when inspecting so that the ultrasonic wave easily propagates between the object and the detector 130. Each of the detection elements 132 transmits an ultrasonic wave US toward the member 10 coated with the couplant 15 and receives reflected waves RW from the member 10.

Or, instead of the couplant 15, a soft propagating member through which the ultrasonic wave easily propagates may be located at the tip of the detector 130. The soft propagating member is softer than the hard propagating member 133. The soft propagating member deforms along the shape of the surface of the weld portion 13 when contacting the weld portion 13. The soft propagating member includes, for example, a gel resin.

For example, as illustrated in FIG. 3, one detection element 132 transmits the ultrasonic wave US toward the weld portion 13. A portion of the ultrasonic wave US is reflected by the upper surface or the lower surface of the member 10, etc. The multiple detection elements 132 each receive (detect) the reflected waves RW. The detection elements 132 sequentially transmit the ultrasonic wave US; and the reflected waves RW are detected by the multiple detection elements 132.

When the detection result of the reflected waves is obtained, the processing device 110 performs the following first and second determinations. In the first determination, the processing device 110 determines whether or not points of the welding object are joined based on the obtained detection result. In the second determination, the processing device 110 determines the appropriateness of the result of the first determination based on the detection result of the reflected waves or the result of the first determination.

The first determination and the second determination will now be described in detail.

(First Determination)

FIG. 4 is schematic views for describing processing according to the processing system according to the embodiment.

Figure 4A:
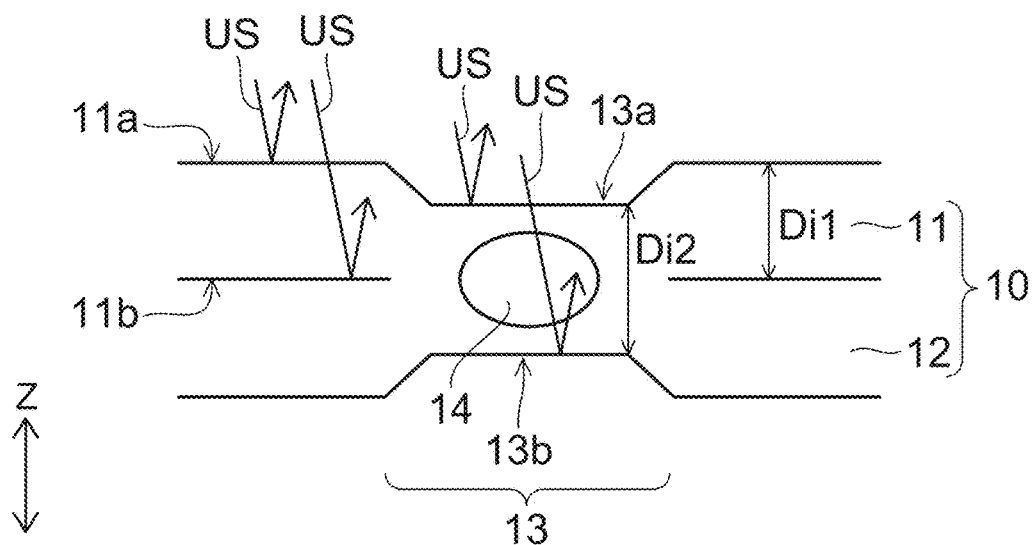
FIG. 4 is schematic views for describing processing according to the processing system according to the embodiment.

As illustrated in FIG. 4A, a portion of the ultrasonic wave US is reflected by an upper surface 11a of the metal plate 11 or an upper surface 13a of the weld portion 13. Another portion of the ultrasonic wave US enters the member 10 and is reflected by a lower surface 11b of the metal plate 11 or a lower surface 13b of the weld portion 13.

The positions in the Z-direction of the upper surface 11a, the upper surface 13a, the lower surface 11b, and the lower surface 13b are different from each other. In other words, the distance in the Z-direction between the detection element 132 and these surfaces are different from each other. The peaks of the intensities of the reflected waves are detected when the detection element 132 receives the reflected waves from these surfaces. Which surface reflected the ultrasonic wave US can be verified by calculating the time until each peak is detected after transmitting the ultrasonic wave US.

Figures 4B, 4C:
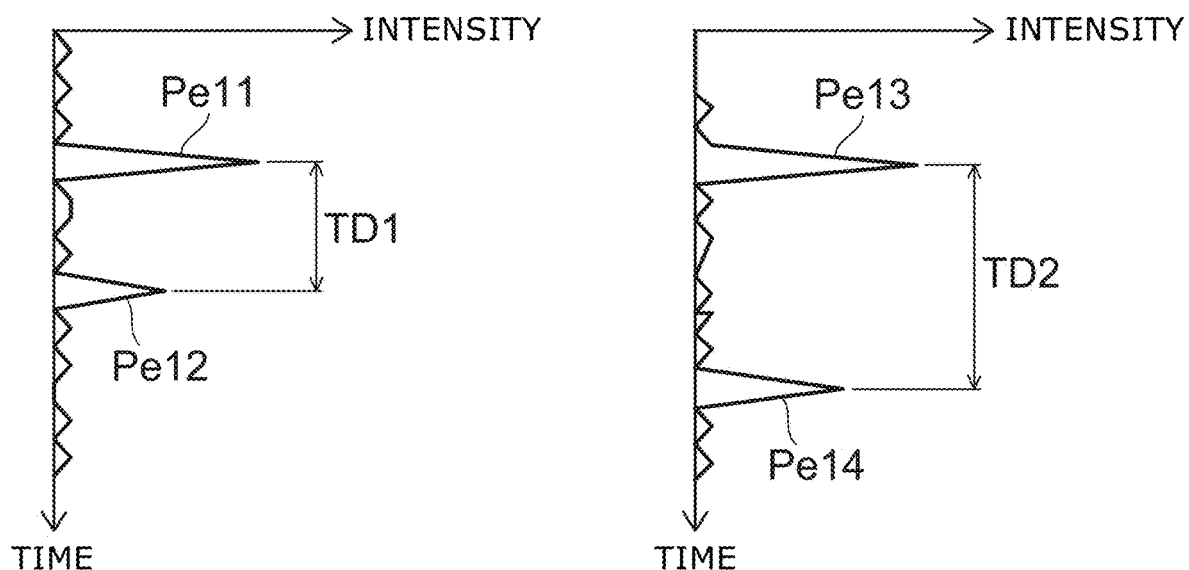

FIGS. 4B and 4C are graphs illustrating the relationship between the time after transmitting the ultrasonic wave US and the intensity of the reflected wave RW. In FIGS. 4B and 4C, the vertical axis is the elapsed time after transmitting the ultrasonic wave US. The horizontal axis is the intensity of the detected reflected wave RW. Here, the intensity of the reflected wave RW is illustrated as an absolute value. The graph of FIG. 4B illustrates the detection result of the reflected waves RW from the upper surface 11a and the lower surface 11b of the metal plate 11. The graph of FIG. 4C illustrates the detection result of the reflected waves RW from the upper surface 13a and the lower surface 13b of the weld portion 13.

In the graph of FIG. 4B, a peak Pe11 occurring first is based on the reflected wave RW from the upper surface 11a. A peak Pe12 occurring second is based on the reflected wave RW from the lower surface 11b. The times at which the peak Pe11 and the peak Pe12 are detected correspond respectively to the positions in the Z-direction of the upper surface 11a and the lower surface 11b of the metal plate 11. A time difference TD1 between the time at which the peak Pe11 is detected and the time at which the peak Pe12 is detected corresponds to a distance Di1 in the Z-direction between the upper surface 11a and the lower surface 11b.

Similarly, in the graph of FIG. 4C, a peak Pe13 occurring first is based on the reflected wave RW from the upper surface 13a. A peak Pe14 occurring second is based on the reflected wave RW from the lower surface 13b. The times at which the peak Pe13 and the peak Pe14 are detected correspond respectively to the positions in the Z-direction of the upper surface 13a and the lower surface 13b of the weld portion 13. A time difference TD2 between the time at which the peak Pe13 is detected and the time at which the peak Pe14 is detected corresponds to a distance Di2 in the Z-direction between the upper surface 13a and the lower surface 13b.

The processing device 110 determines whether or not the time difference between the peaks corresponds to the thickness of the weld portion 13. When the time difference between the peaks is determined to correspond to the thickness of the weld portion 13, the point is determined to be joined. For example, the processing device 110 compares the time difference between the peaks to a preset threshold at points in the X-Y plane. When the time difference is not less than the threshold, the processing device 110 determines that the point is joined. When the time difference is less than the threshold, the processing device 110 determines that the point is not joined. The threshold is set based on the thickness of the weld portion 13. A range may be set instead of the threshold. The processing device 110 determines that the point is joined when the time difference is within the range.

The intensity of the reflected wave may be represented in any form. For example, the reflected wave intensity that is output from the detection element 132 includes positive values and negative values according to the phase. Various processing may be performed based on the reflected wave intensity including the positive values and the negative values. The reflected wave intensity that includes the positive values and the negative values may be converted into an absolute value. The average value of the reflected wave intensities may be subtracted from the reflected wave intensity at each time. Or, the weighted average value, the weighted moving average value, or the like of the reflected wave intensities may be subtracted from the reflected wave intensity at each time. The various processing described in the application can be performed even when the results of such processing applied to the reflected wave intensity are used.

Figure 5:
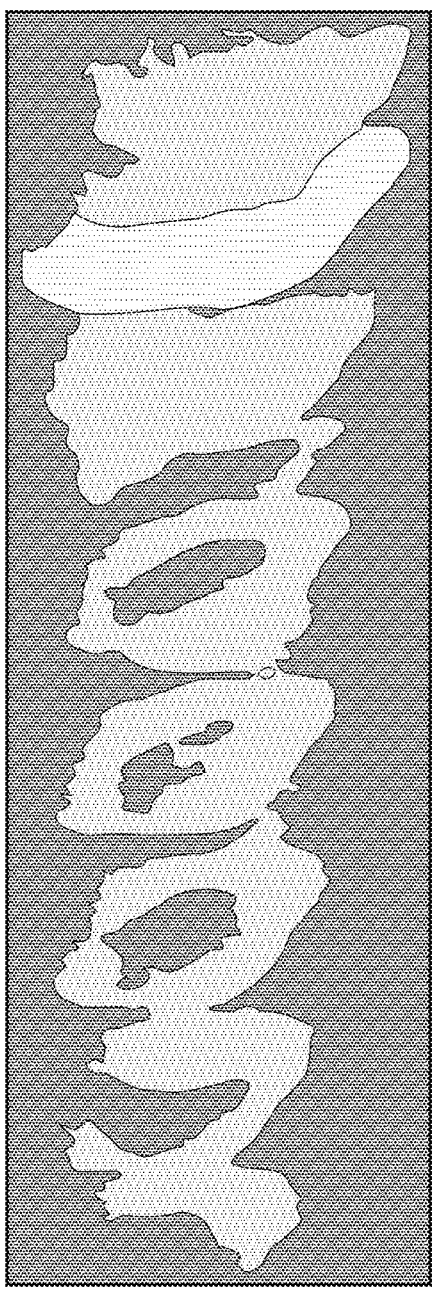
FIG. 5 is an example of an image obtained by the processing system according to the embodiment.
Figure 5:
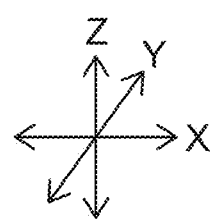

FIG. 5 is an example of an image obtained by the processing system according to the embodiment.

FIG. 5 is an image depicted based on the detection result of the reflected waves. In FIG. 5, the luminance (the whiteness) of each point indicates the intensity of the reflected wave at the point. As illustrated in FIG. 5, three-dimensional volume data is obtained as the detection result of the reflected waves. The joint or the non-joint at each point of the welding object is determined based on the detection result of the reflected waves.

FIG. 6 is drawings for describing the processing according to the processing system according to the embodiment.

Figure 6A:
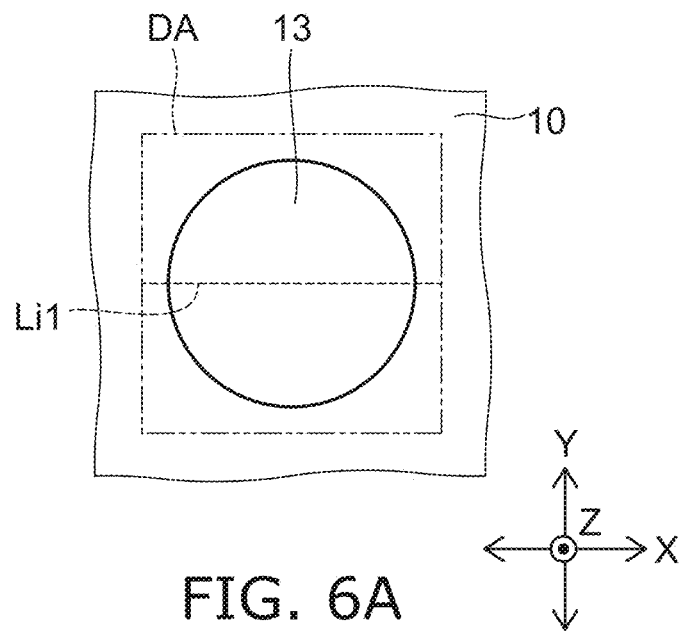
FIG. 6 is drawings for describing the processing according to the processing system according to the embodiment.

FIG. 6A is a plan view schematically illustrating the weld portion 13 vicinity. For example, it is determined whether or not points of a detection area DA illustrated in FIG. 6A are joined based on the reflected waves detected by the detector 130.

Figure 6B:
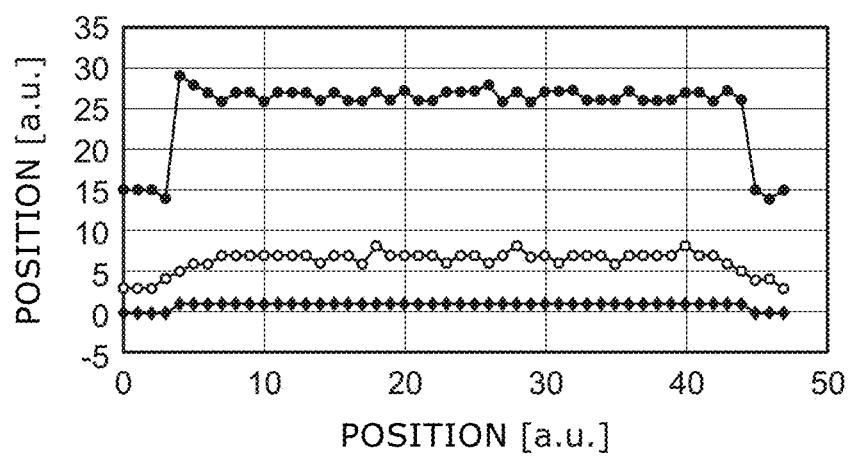

FIG. 6B illustrates an example of the detection result at points of a line segment Li1 illustrated in FIG. 6A. In FIG. 6B, the vertical axis is the position in the Z-direction perpendicular to the X-direction and the Y-direction. The horizontal axis is the position in the X-direction. In FIG. 6B, ○ (the white circles) illustrate the position in the Z-direction of a first reflecting surface of the member 10. The first reflecting surface is the upper surface 11a of the metal plate 11, the upper surface 13a of the weld portion 13, etc. ● (the black circles) illustrate the position in the Z-direction of a second reflecting surface of the member 10. The second reflecting surface is the lower surface 11b of the metal plate 11, the lower surface 13b of the weld portion 13, etc. As described above, these positions are calculated based on the time after transmitting the ultrasonic wave US until the peak of the reflected wave RW is detected. In FIG. 6B, ◆ illustrate the determination result of the joint and the non-joint. The points that are determined to be joined are illustrated by the value of 1; and the points that are determined to be non-joints are illustrated by the value of 0.

Figure 7:
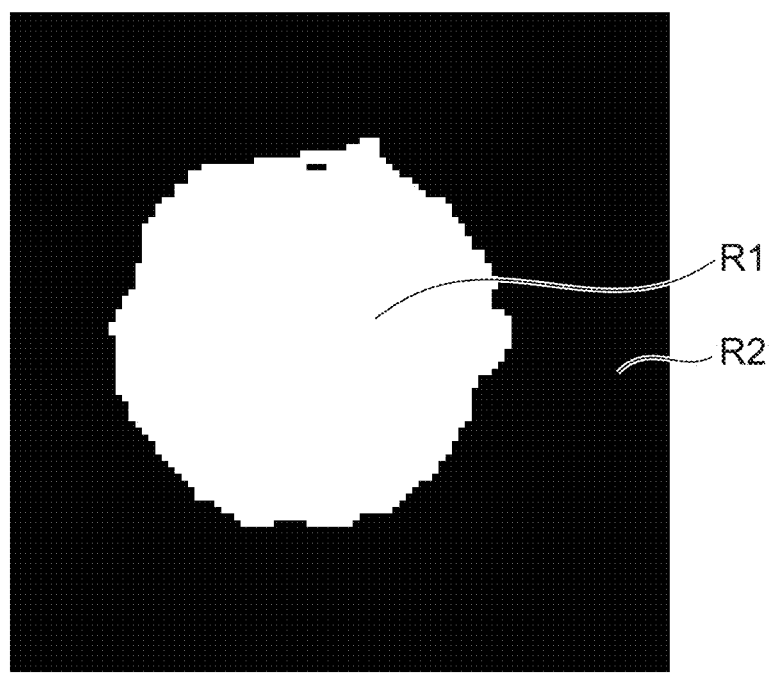
FIG. 7 is an example of an image illustrating the processing result of the processing system according to the embodiment.

FIG. 7 is an example of an image illustrating the processing result of the processing system according to the embodiment.

According to the method described above, the first determination of determining whether or not the points of the detection area DA are joined is performed. The processing device 110 generates, for example, the image illustrated in FIG. 7 based on the result of the first determination. In FIG. 7, white shows that the point is joined. Black shows that the point is not joined. A first region R1 that is based on a cluster of white spots corresponds to the weld portion 13. A second region R2 that is based on a cluster of black spots corresponds to the member 10 around the weld portion 13.

The processing device 110 may determine the goodness of the weld of the welding object based on the surface area of the first region R1. The processing device 110 may calculate the surface area of the weld portion 13 based on the surface area of the first region R1. The processing device 110 may calculate the diameter of the weld portion 13 based on the diameter of the first region R1. For example, the distances between the detection elements 132 are prestored in the memory device 120. The processing device 110 calculates the surface area or the diameter of the weld portion 13 by using the stored distances and the number of pixels of the first region R1. For example, the processing device 110 calculates the major diameter and the minor diameter of the weld portion 13 as the diameter. The processing device 110 may calculate the average of the major diameter and the minor diameter. The processing device 110 may calculate the equivalent circle diameter of the first region R1 as the diameter of the weld portion 13. The equivalent circle diameter of the first region R1 is obtained by calculating the diameter of an imaginary circle that has the surface area of the first region R1. The processing device 110 determines the goodness of the weld of the welding object by comparing any of the calculated values to a preset threshold.

The first region R1 may include only a cluster of white spots, or may include a portion of the black spots. For example, the processing device 110 sets a cluster of white spots and the black spots surrounded with the cluster of white spots as the first region R1. When multiple clusters of white spots exist, the processing device 110 sets the clusters of white spots and the black spots positioned between the clusters of white spots as the first region R1.

There are cases where the upper surface 13a and the lower surface 13b of the weld portion 13 are tilted with respect to the upper surface 11a of the metal plate 11. This is due to the weld portion 13 including the solidified portion 14, shape deformation in the welding process, etc. In such a case, it is desirable for the ultrasonic waves US to be transmitted along a direction that is, on average, perpendicular to the upper surface 13a or the lower surface 13b. Thereby, the ultrasonic waves can be more intensely reflected at the upper surface 13a and the lower surface 13b; and the accuracy of the inspection can be increased.

(Second Determination)

In the second determination, the appropriateness of the result of the first determination is determined. Namely, the determination result of joint or non-joint at the points performed by the first determination is determined to be appropriate or not. To determine the appropriateness of the result of the first determination, the processing device 110 uses the detection result of the reflected waves or the result of the first determination.

For example, when the result of the first determination is determined to be appropriate, the processing device 110 performs the following first operation. In the first operation, the processing device 110 employs the result of the first determination. For example, the processing device 110 employs data derived based on the result of the first determination as the inspection result of the welding object. For example, the data includes at least one of the surface area or the diameter of the weld portion 13. The data may include the goodness of the weld determined based on the surface area or the diameter of the weld portion 13. The data may be derived between the first determination and the second determination or may be derived after the second determination. The processing device 110 may derive the data based on the result of the first determination only when the result of the first determination is determined to be appropriate. In the first operation, the processing device 110 may output at least one of an image of the result of the first determination, the surface area of the weld portion 13, the diameter of the weld portion 13, or the determination result of the goodness of the weld to the memory device 120 or the display device 150.

When the processing device 110 determines the result of the first determination to be inappropriate, the processing device 110 performs the following second operation. In the second operation, the processing device 110 does not employ the result of the first determination. For example, when the data such as the surface area of the weld portion 13, the diameter of the weld portion 13, the determination result of the goodness of the weld, or the like is derived between the first determination and the second determination, the processing device 110 does not employ such data as the inspection result of the welding object. In the second operation, the processing device 110 may output the determination result that the result of the first determination is inappropriate to the memory device 120 or the display device 150. In the second operation, the processing device 110 may prompt the user to re-probe the weld portion 13. When the result of the first determination is determined to be inappropriate by the processing device 110, the detector 130 may automatically re-probe the weld portion 13.

Effects of the embodiment will now be described.

For example, when inspecting a welding object, there is a method of determining the joint and the non-joint at multiple points of the welding object and determining the goodness of the weld based on the surface area of the first region R1. Or, there is a method of calculating the surface area or the diameter of the weld portion 13 based on the surface area or the diameter of the first region R1 and determining the goodness of the weld based on the surface area or the diameter of the weld portion 13. According to these methods, the goodness of the weld of the welding object can generally be determined with high accuracy.

Further examination of the methods described above by the inventors showed that cases exist where the determination of the goodness of the weld portion 13 is difficult. Specifically, it was found that cases exist where a weld portion 13 that is actually sufficiently welded is determined to be defective even when the tilt of the detector 130 is sufficiently small with respect to the weld portion 13 and the detector 130 reliably contacts the weld portion 13.

FIGS. 8A to 8C and FIG. 9 are schematic views showing images based on detection results of reflected waves.

Figure 8A:
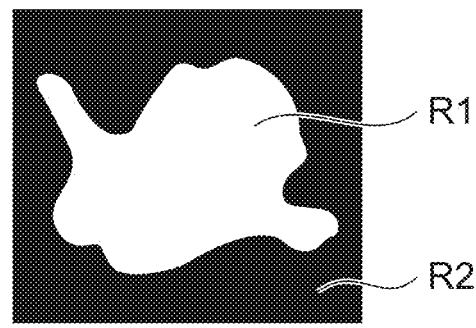
FIG. 8 is schematic views showing images based on detection results of reflected waves.
Figure 8B:
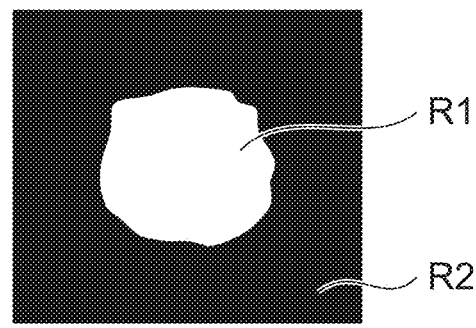
Figure 8C:
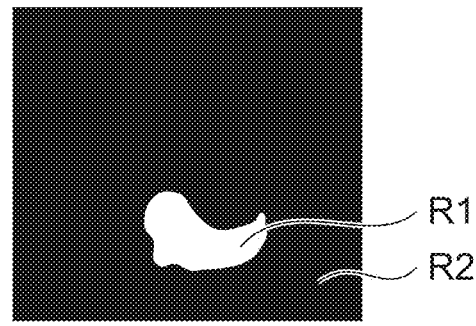

Similarly to FIG. 7, the images of FIGS. 8A to 8C illustrate results of the joint being determined at multiple points of the welding object. The determination results of the joint illustrated in FIGS. 8A to 8C are based on detection results of the same portion of the same welding object and are obtained in states in which the tilts of the detector 130 are sufficiently small. The inventors discovered that cases exist where the shape and size of the first region R1 greatly fluctuate between the detection results as shown in FIGS. 8A to 8C. Although the cause of the fluctuation is not yet clear, it is considered that the fluctuation is affected by the tilt of the weld portion 13 with respect to the entire welding object, the material of the welding object, etc. In the image of FIG. 8A, a portion of the first region R1 protrudes. In FIG. 8C, the entire first region R1 is curved. It would be difficult for the actual weld portion 13 to have the shape of the first region R1 illustrated in these images. Compared to the other images, the first region R1 is close to a circle in the image of FIG. 8B. Compared to the first region R1 of the other images, the first region R1 of FIG. 8B is closer to the shape of the actual weld portion 13.

Figure 9:
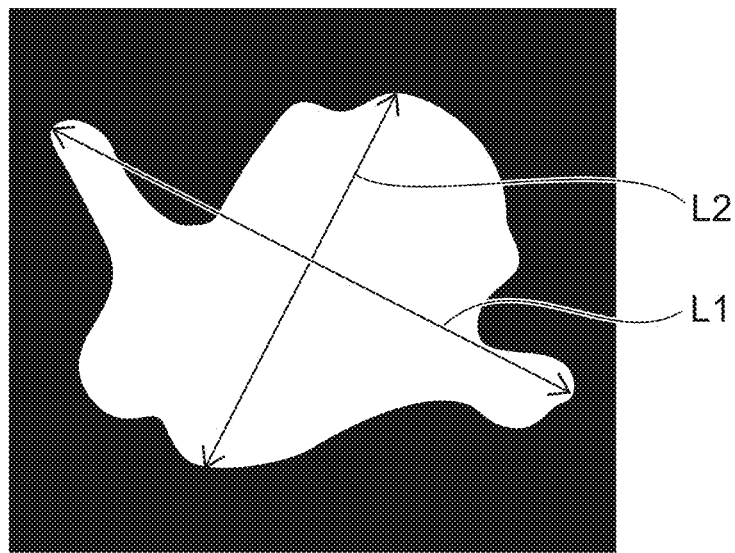
FIG. 9 is a schematic view showing the image based on the detection result of the reflected waves.

FIG. 9 is the same as the image illustrated in FIG. 8A. When the major diameter and the minor diameter of the weld portion 13 are calculated in the inspection, there is a possibility that a major diameter L1 and a minor diameter L2 of the first region R1 may be calculated using the protruded portions as the reference as illustrated in FIG. 9. In such a case, the major diameter and the minor diameter of the weld portion 13 that are calculated are greater than the actual value. For the surface area as well, the surface area of the weld portion 13 that is calculated is greater than the actual value.

In the image illustrated in FIG. 8C, the size of the weld portion 13 shown by the first region R1 is less than the size of the actual weld portion 13. There is a possibility that the major diameter and the minor diameter of the weld portion 13 that are calculated may be less than the actual values for such images.

When the surface area or the diameter of the weld portion 13 that is calculated is different from the actual value, there is a possibility that the goodness of the weld also may be erroneously determined based on the surface area or the diameter of the weld portion 13. For example, when the surface area or the diameter of the weld portion 13 that is calculated is greater than the actual value, there is a possibility that the weld may be determined to be good even though the weld actually is defective. When the surface area or the diameter of the weld portion 13 that is calculated is less than the actual value, there is a possibility that the weld may be determined to be defective even though the weld actually is good. When the surface area or the diameter of the weld portion 13 is referred to in another process for quality control, there is a possibility that a problem may occur in the other process.

For this problem, the processing device 110 of the processing system 100 according to the embodiment performs the second determination in addition to the first determination. In the second determination, the appropriateness of the result of the first determination is determined. Namely, it is determined whether or not the determination result of the joint and the non-joint is appropriate for multiple points of the welding object. For example, more accurate data related to the welding object can be derived by employing the result of the first determination only when the result of the first determination is determined to be appropriate by the second determination. For example, more accurate data for the surface area of the weld portion 13, the diameter of the weld portion 13, the goodness of the weld, etc., can be obtained.

By performing the second determination, it is unnecessary for the user to determine the appropriateness of the result of the first determination based on an image such as that illustrated in FIG. 7. Thereby, the appropriateness of the result of the first determination can be determined without being dependent on the knowledge and the experience of the user. Even when a user that has insufficient experience performs the inspection, only the more appropriate data can be employed as the inspection result.

Multiple methods for performing the second determination will now be described.

(First Method)

The processing device 110 calculates a first evaluation value based on the detection result of the reflected waves or the result of the first determination. The processing device 110 stores the calculated first evaluation value in the memory device 120. The processing device 110 refers to a previous first evaluation value stored in the memory device 120. The processing device 110 determines the appropriateness of the result of the first determination by using the first evaluation value and the previous first evaluation value.

Specifically, the processing device 110 calculates a second evaluation value based on the previous first evaluation value. The processing device 110 determines the appropriateness of the result of the first determination by comparing the difference between the first evaluation value and the second evaluation value to a first threshold. For example, the directly-previous first evaluation value may be used as the second evaluation value. It is favorable for the second evaluation value to be set based on multiple previous first evaluation values. For example, the average of a preset number of previous first evaluation values is used as the second evaluation value.

The first threshold may be set by the user or may be set based on a previous first evaluation value. For example, the processing device 110 calculates the variance or the standard deviation of multiple previous first evaluation values. The processing device 110 calculates the first threshold by multiplying the variance or the standard deviation by a prescribed value.

For example, the first evaluation value is set based on the diameter of the weld portion 13. As described above, the diameter of the weld portion 13 is calculated from the result of the first determination. The processing device 110 may use the diameter of the weld portion 13 as the first evaluation value, or may use a value calculated based on the diameter of the weld portion 13 as the first evaluation value.

Or, the first evaluation value may be a value output from a first model. For example, the first model is trained to output a larger value as the result of the first determination becomes more appropriate. The trained first model is stored in the memory device 120. Image data of the determination result of the joint and the non-joint at points of the welding object such as that illustrated in FIG. 7 is used to train the first model. A label that indicates whether the image data is appropriate or inappropriate is assigned to the image data. The first model is trained using multiple sets of image data and multiple labels. The processing device 110 inputs the image data based on the result of the first determination to the trained first model, and uses the value (the activity) of the output layer indicating that the image data is appropriate as the first evaluation value. Or, the processing device 110 may use another value calculated based on the value of the output layer as the first evaluation value.

As illustrated in FIGS. 8A to 8C, the shape of the first region R1 that is obtained approaches a circle as the result of the first determination becomes more appropriate. Therefore, the circularness of the first region R1 may be used as the first evaluation value. The circularness indicates the shape of the first region and the degree of similarity with a circle. For example, the shape of the first region approaches a circle as the value of the circularness increases. The roundness, the circularity, or the ellipticity can be used as the circularness. The processing device 110 uses the roundness, the circularity, the ellipticity, or the ratio of the diameters as the first evaluation value. The processing device 110 uses a value calculated based on the roundness, the circularity, the ellipticity, or the ratio of the diameters as the first evaluation value.

The roundness is calculated by the following method. A circle that inscribes the outer edge of the first region and another circle that circumscribes the outer edge of the first region are set. The centers of the two circles exist at the same position. The two circles are set to reduce the spacing between the two circles. The radius difference of the two circles corresponds to the roundness. The method for setting the center of the circles is arbitrary. For example, the following four methods are used. In the first method, the center of an approximate circle of the least squares method is used. In the second method, the center of the maximum circle inscribing the outer edge is used. In the third method, the center of the minimum circle circumscribing the outer edge is used. In the fourth method, the center of the inscribed circle and the circumscribed circle at which the radius difference is a minimum is used. The roundness can be calculated in accordance with JIS B 0621 (1984). JIS B 0621 (1984) corresponds to ISO 1101 (1983).

The circularity is represented by $4\pi A/L^2$ using a surface area A of the first region and a length L of the outer perimeter of the first region. The ellipticity is represented by the ratio of the major diameter to the minor diameter. For example, the major diameter is the longest line segment obtained by connecting any two points on the outer edge of the first region R1. The minor diameter is the length of a line segment that passes through the center of the major diameter and is perpendicular to the major diameter.

A ratio (r2/r1) of a diameter r2 of the first region to an equivalent circle diameter r1 of the first region R1 may be used as the circularness. For example, the average value of the major diameter and the minor diameter is used as the diameter r2. The average value of lengths of the first region R1 in multiple directions may be used as the diameter r2.

The processing device 110 may calculate the first evaluation value by using at least two selected from the roundness, the circularity, the ellipticity, and the ratio of the diameter. For example, the processing device 110 calculates the average value or the sum of at least two selected from the roundness, the circularity, the ellipticity, and the ratio of the diameter as the first evaluation value. For example, as illustrated in FIG. 9, there is a possibility that the major diameter L1 and the minor diameter L2 of the first region R1 that are calculated may be much different from the major diameter and the minor diameter of the actual weld portion 13. As a result, the minor diameter L2 of the first region R1 may be a value close to the major diameter L1. Therefore, when the ellipticity is used to calculate the first evaluation value, there is a possibility that the first region R1 may be determined to be circle-like even though the shape of the first region R1 is much different from a circle. Accordingly, when the ellipticity is used to calculate the first evaluation value, it is favorable to also use the roundness, the circularity, or the ratio of the diameter.

The first evaluation value may be calculated using a comparison between the detection result of the reflected waves and data prepared beforehand or a comparison between the result of the first determination and data prepared beforehand. For example, image data when the result of the first determination is appropriate such as that illustrated in FIG. 7 is prepared beforehand. The processing device 110 calculates the similarity between the image data of the result of the first determination and image data prepared beforehand as the first evaluation value. Or, the processing device 110 may calculate the similarity between volume data of the detection result of the reflected waves and data prepared beforehand as the first evaluation value. The processing device 110 may use a value calculated based on the similarity as the first evaluation value.

The processing device 110 determines the result of the first determination to be appropriate when the difference between the first evaluation value and the second evaluation value is less than the first threshold. The processing device 110 performs the first operation described above when the result of the first determination is determined to be appropriate. The processing device 110 determines the result of the first determination to be inappropriate when the difference between the first evaluation value and the second evaluation value is not less than the first threshold. The processing device 110 performs the second operation described above when the result of the first determination is determined to be inappropriate.

Figure 10:
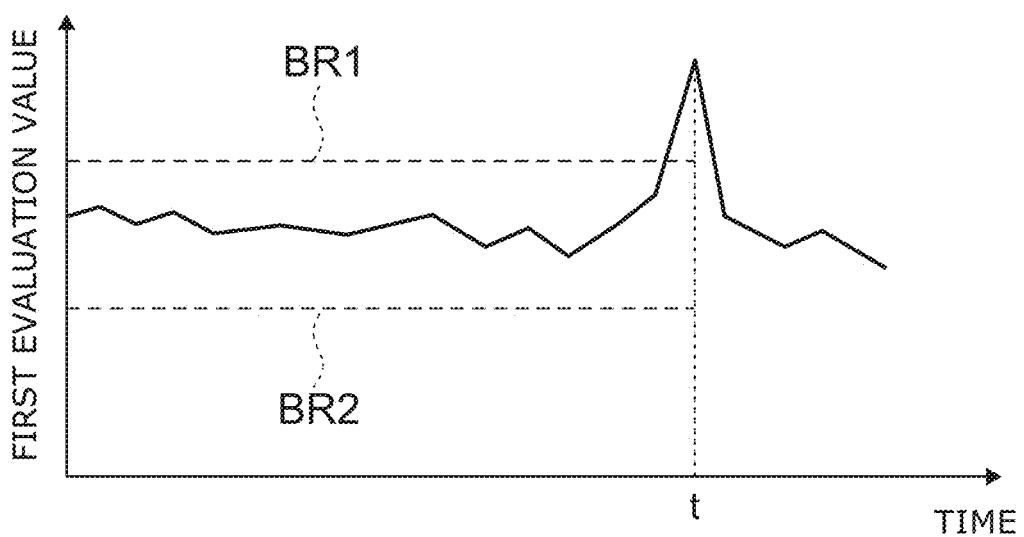
FIG. 10 is a graph for describing a second determination.

FIG. 10 is a graph for describing the second determination.

In FIG. 10, the horizontal axis is time, and the vertical axis is the first evaluation value calculated at each time. For example, when calculating the first evaluation value at a time t, the processing device 110 sets the second evaluation value and the first threshold by using multiple first evaluation values before the time t. The processing device 110 determines whether or not the difference between the first evaluation value and the second evaluation value is not less than the first threshold. In FIG. 10, a broken line BR1 shows the value of the first threshold added to the second evaluation value. A broken line BR2 shows the value of the first threshold subtracted from the second evaluation value. In the example, the first evaluation value at the time t is not less than the value of the first threshold added to the second evaluation value. In other words, the difference between the first evaluation value and the second evaluation value is not less than the first threshold. Therefore, the processing device 110 determines the result of the first determination to be inappropriate.

(Second Method)

The processing device 110 may determine whether or not the result of the first determination is appropriate by inputting the detection result of the reflected waves or the result of the first determination to the first model. In the first model, the processing device 110 classifies (classifies or clusters) the detection result of the reflected waves or the result of the first determination.

For example, the processing device 110 inputs image data of the result of the first determination illustrated in FIG. 7 to the first model. The first model is trained by supervised learning and classifies the input image data. Image data of the determination result of the joint and the non-joint at points of the welding object such as that illustrated in FIG. 7 is used to train the first model. For example, a label that indicates inappropriateness is assigned to image data in which a portion of the first region R1 protrudes or image data in which the first region R1 is curved as illustrated in FIG. 8A or FIG. 8C. A label that indicates appropriateness is assigned when the first region R1 is close to a circle as illustrated in FIG. 8A or FIG. 8C. The first model is trained using the multiple sets of image data and the multiple labels. When the input image data is classified as a first category indicating appropriateness, the processing device 110 determines the result of the first determination to be appropriate. When the input image data is classified as a second category indicating inappropriateness, the processing device 110 determines the result of the first determination to be inappropriate.

The first model may be trained by unsupervised learning. In such a case, the input image data is clustered in one of the multiple categories by the first model. The processing device 110 determines that the result of the first determination is appropriate when the input image data is clustered in the first category including image data in which the shape of the first region R1 is close to a circle such as that illustrated in FIG. 8B. The processing device 110 determines the result of the first determination to be inappropriate when the input image data is clustered in the second category including image data in which a portion of the first region R1 protrudes such as that illustrated in FIG. 8A or image data in which the first region R1 is curved such as that illustrated in FIG. 8C.

Or, three-dimensional volume data that is the detection result of the reflected waves may be input to the first model. In such a case, supervised learning or unsupervised learning of the first model is performed using multiple sets of three-dimensional data. When the input data is classified as the first category indicating appropriateness, the processing device 110 also determines the result of the first determination to be appropriate based on the data. When the input data is classified as the second category indicating inappropriateness, the processing device 110 also determines the result of the first determination to be inappropriate based on the data.

In the second method as described above, the processing device 110 determines the result of the first determination to be appropriate when the detection result of the reflected waves or the result of the first determination is classified as the first category by the first model. The processing device 110 performs the first operation described above when the result of the first determination is determined to be appropriate. The processing device 110 determines the result of the first determination to be inappropriate when the detection result of the reflected waves or the result of the first determination is classified as the second category by the first model. The processing device 110 performs the second operation described above when the result of the first determination is determined to be inappropriate.

The processing device 110 may determine the appropriateness of the result of the first determination by combining the first method and the second method. For example, the processing device 110 finally determines the result of the first determination to be appropriate when the result of the first determination is determined to be appropriate by the first method and when the result of the first determination is determined to be appropriate by the second method. Or, the processing device 110 may finally determine the result of the first determination to be appropriate when the result of the first determination is determined to be appropriate by the first method or when the result of the first determination is determined to be appropriate by the second method. The accuracy of the second determination can be increased by appropriately combining the first method and the second method.

Figure 11:
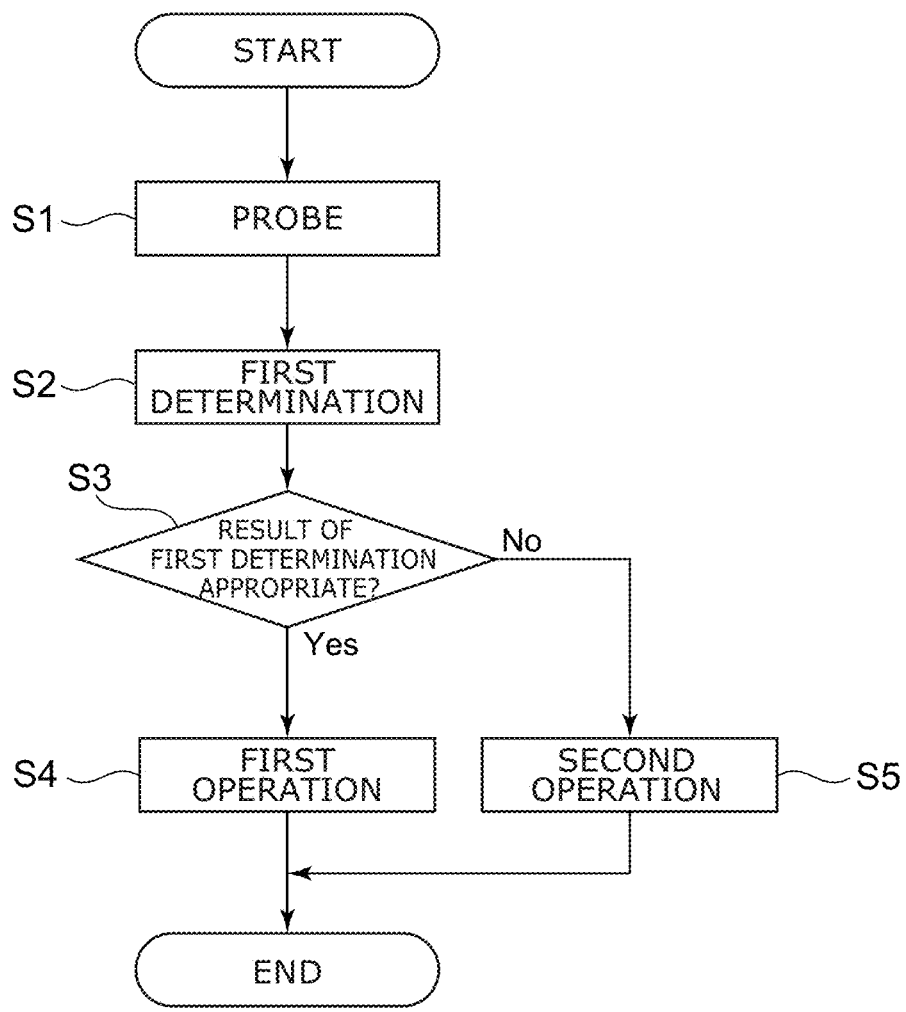
FIG. 11 is a flowchart illustrating the flow of an inspection using the processing system according to the embodiment.

FIG. 11 is a flowchart illustrating the flow of the inspection using the processing system according to the embodiment.

The user causes the tip of the detector 130 to contact the weld portion 13. The user probes using the detector 130 (step S1). For example, a button for performing the probe is provided in the detector 130. The user can probe using the detector 130 by operating the button. Or, the user may probe using the detector 130 via a user interface displayed by the display device 150. The detector 130 transmits the detection result of the reflected waves obtained by the probing to the processing device 110.

When receiving the detection result, the processing device 110 performs the first determination of determining the joint and the non-joint at multiple points of the welding object (step S2). The processing device 110 performs the second determination of determining the appropriateness of the result of the first determination (step S3). When the result of the first determination is determined to be appropriate, the processing device 110 performs the first operation (step S4). When the result of the first determination is determined to be inappropriate, the processing device 110 performs the second operation (step S5).

Based on the detection result of the reflected waves, the processing device 110 may estimate the range of the weld portion 13 and calculate the tilt with respect to the weld portion 13. Here, the angle between the normal direction of the surface of the weld portion 13 and the direction of the detector 130 is called the tilt. For example, the direction of the detector 130 corresponds to the Z-direction that is perpendicular to the arrangement direction of the detection elements 132. The tilt is zero when the detector 130 perpendicular contacts the surface of the weld portion 13.

The tilt of the detector 130 with respect to the welding object or the weld portion 13 may affect the inspection result. For example, when the first determination is performed in a state in which the detector 130 is tilted with respect to the welding object, there is a possibility that a non-joint may be determined even though the actual joint is appropriately joined. It is therefore favorable for the tilt of the detector 130 with respect to the welding object to be set to be small before performing the first determination.

The tilt of the detector 130 is calculated using the detection result of the reflected waves from the weld portion 13. In the first determination, it is sufficient for the joint and the non-joint to be determined for the reflected waves from at least the weld portion 13. The time necessary for the processing can be reduced by reducing the calculation amount of the detection result of the reflected waves from regions other than the weld portion 13. It is therefore favorable to extract a portion of the detection result including the reflected waves from the weld portion 13 before calculating the tilt and performing the first determination.

Figure 12:
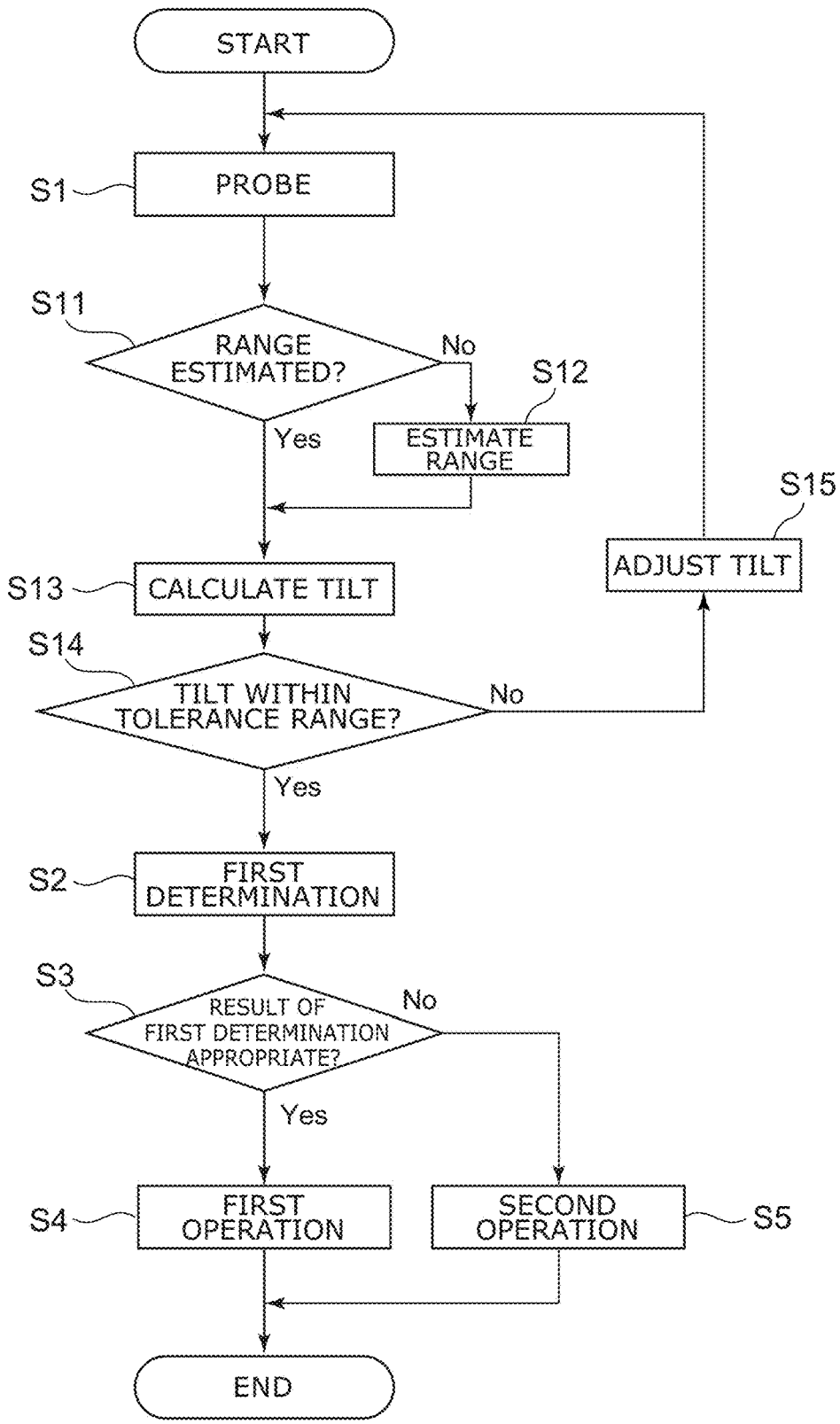
FIG. 12 is a flowchart illustrating the flow of the inspection using the processing system according to the embodiment.

FIG. 12 is a flowchart illustrating the flow of the inspection using the processing system according to the embodiment.

The flow of an inspection when the estimation of the range and the calculation of the tilt are performed is described with reference to FIG. 12. The user probes using the detector 130 (step S1). When the probing is performed, the processing device 110 determines whether or not a range that corresponds to the reflected waves from the weld portion 13 is estimated for the welding object that is probed (step S11). When the range is not yet estimated, the processing device 110 estimates the range (step S12).

For example, as illustrated in FIGS. 4A and 6B, the ultrasonic wave also is reflected from surfaces other than the weld portion 13. The processing device 110 estimates the range corresponding to the reflected waves from the weld portion 13 and subsequently calculates the tilt based on the reflected waves included in this range. The necessary calculation amount can be reduced thereby. The accuracy of the calculated tilt can be increased.

The processing device 110 calculates the tilt of the detector 130 based on the detection result of the reflected waves within the estimated range (step S13). It is determined whether or not the calculated tilt is within a tolerance range (step S14). The determination may be performed by the user or may be performed by the processing device 110. When the processing device 110 performs the determination, the tolerance range may be preset by the user or may be set based on the history of previous inspection results.

For example, when performing the inspection of the weld portion 13, the processing device 110 measures the diameter of the weld portion 13 based on the detection result. When the tilt of the detector 130 is too large, the diameter of the weld portion 13 that is calculated is less than the actual value. The calculated diameter of the weld portion 13 increases as the tilt of the detector 130 decreases. When the tilt of the detector 130 is sufficiently small, the calculated diameter of the weld portion 13 substantially no longer changes. Such relationships between the tilt of the detector 130 and the diameter of the weld portion 13 calculated previously are stored in the memory device 120. Based on the data stored in the memory device 120, the processing device 110 determines a boundary value so that the change of the diameter of the weld portion 13 with respect to the change of the tilt of the detector 130 becomes small. The processing device 110 sets the size of the tolerance range based on the boundary value. For example, the processing device 110 sets the boundary value as the size of the tolerance range. Or, to increase the accuracy of the inspection, the processing device 110 may set, as the tolerance range, a smaller value that is calculated based on the boundary value.

When the tilt is not within the tolerance range, the user adjusts the tilt of the detector 130 (step S15). When performing step S14, the processing device 110 may notify the user that the tilt is not within the tolerance range. After step S15, step S1 is re-performed using the tilt after the adjustment. When the tilt is within the tolerance range, the first determination is performed (step S2). In the first determination, it is favorable for the joint or the non-joint to be determined at points in the X-Y plane within the range estimated in step S12. After step S2, steps S3 to S5 are performed similarly to the flowchart illustrated in FIG. 11.

An example of specific processing of the estimation of the range, the calculation of the tilt, and the inspection will now be described.

(Range Estimation)

The estimation of the range will now be described in detail with reference to FIGS. 13 to 20.

For example, the detection result of the reflected waves is illustrated two-dimensionally in FIG. 5B. The detection result of the reflected waves may be illustrated three-dimensionally. For example, multiple voxels are set for the member 10. Coordinates in the X-direction, the Y-direction, and the Z-direction are set for each voxel. A reflected wave intensity is associated with each voxel based on the detection result of the reflected waves. The processing device 110 estimates a range (a group of voxels) corresponding to the weld portion 13 for the multiple voxels. The number of voxels and the size of each voxel that are set may be automatically determined or may be set by the user via the user interface of the display device 150.

Figure 13A:
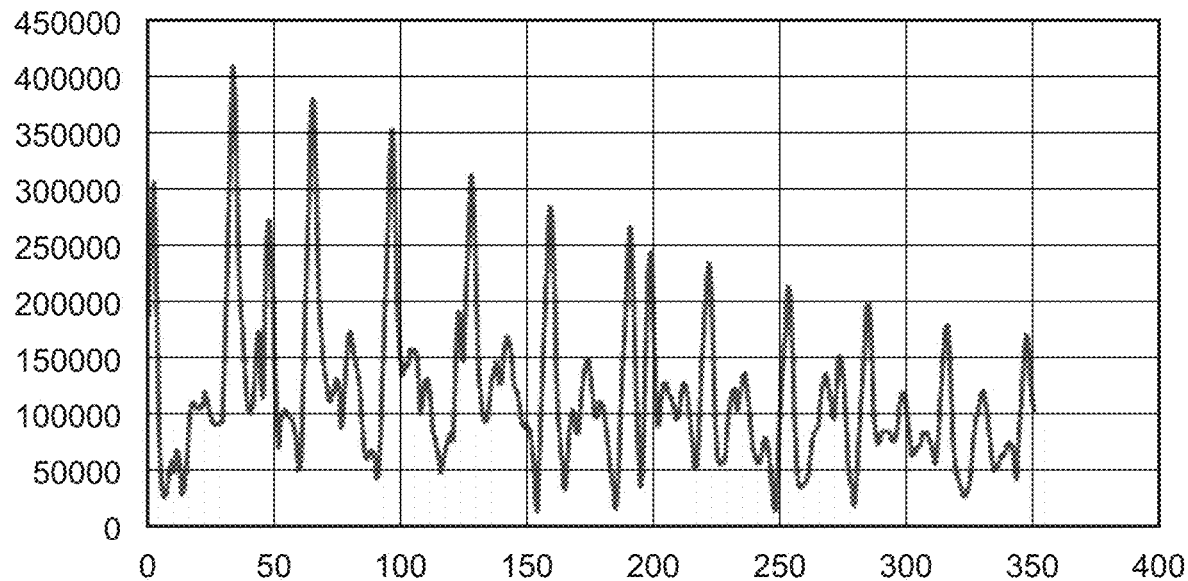
FIG. 13 is graphs illustrating the intensity distribution of the reflected waves in the Z-direction in one cross section.
Figure 13B:
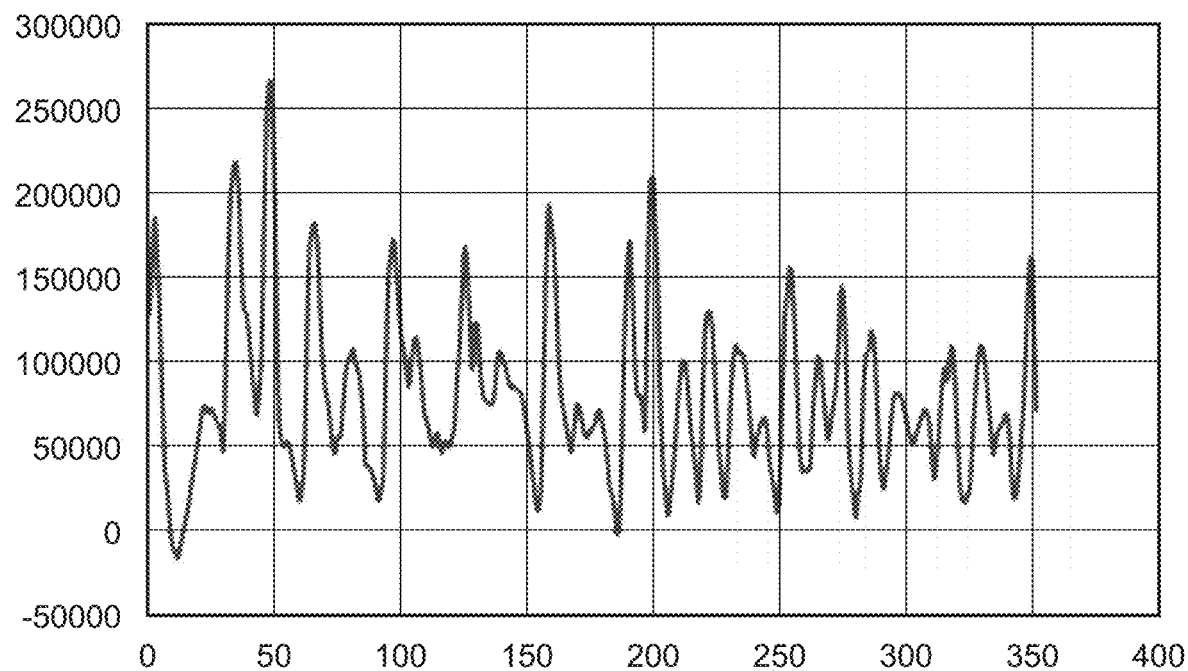

FIGS. 13A and 13B are graphs illustrating the intensity distribution of the reflected waves in the Z-direction in one cross section.

Figure 14:
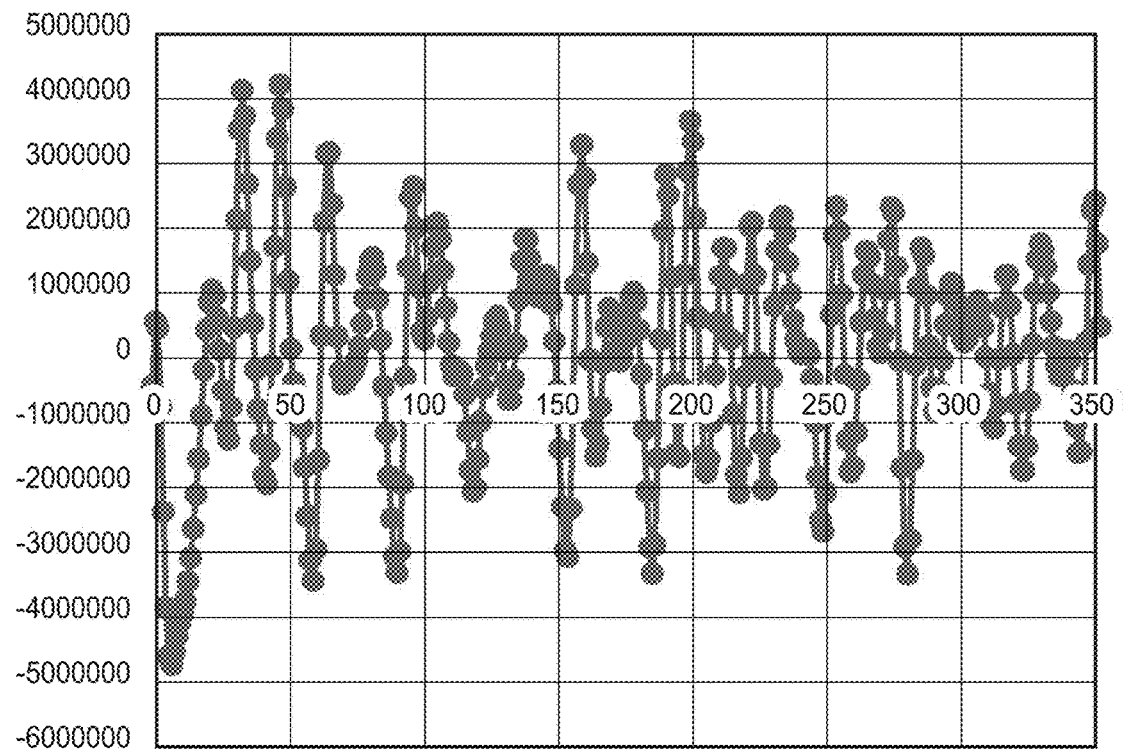
FIG. 14 is a graph illustrating the intensity distribution of the reflected waves in the Z-direction.

FIG. 14 is a graph illustrating the intensity distribution of the reflected waves in the Z-direction.

The processing device 110 generates the intensity distribution of the reflected waves in the Z-direction based on the detection result of the reflected waves. FIGS. 13A and 13B are such examples. In FIGS. 13A and 13B, the horizontal axis is the position in the Z-direction, and the vertical axis is the intensity of the reflected wave. FIG. 13A illustrates the intensity distribution of the reflected waves in the Z-direction in one X-Z cross section. FIG. 13B illustrates the intensity distribution of the reflected waves in the Z-direction in one Y-Z cross section. FIGS. 13A and 13B illustrate the results in which the reflected wave intensities are converted into absolute values.

Or, the processing device 110 may generate the intensity distribution of the reflected waves in the Z-direction by summing the reflected wave intensities in the X-Y plane for multiple points in the Z-direction. FIG. 14 is such an example. In FIG. 14, the horizontal axis is the position in the Z-direction, and the vertical axis is the intensity of the reflected wave. FIG. 14 illustrates the results of converting the reflected wave intensities into absolute values and subtracting the average value of the reflected wave intensities from the reflected wave intensity for each of the multiple points in the Z-direction.

The intensity distribution of the reflected waves in the Z-direction includes components reflected by the upper surface 13a and the lower surface 13b of the weld portion 13 and components reflected by the upper surface and the lower surface of other portions. The processing device 110 extracts only the components reflected by the upper surface 13a and the lower surface 13b of the weld portion 13 from the intensity distribution of the reflected waves by filtering. For example, values that correspond to integer multiples of half of the thickness in the Z-direction (the distance between the upper surface 13a and the lower surface 13b) of the weld portion 13 are preset. The processing device 110 extracts only the periodic components of the values by referring to the values.

A band-pass filter, a zero-phase filter, a low-pass filter, a high-pass filter, threshold determination of the intensity after the filtering, etc., can be used as the filtering.

Figure 15:
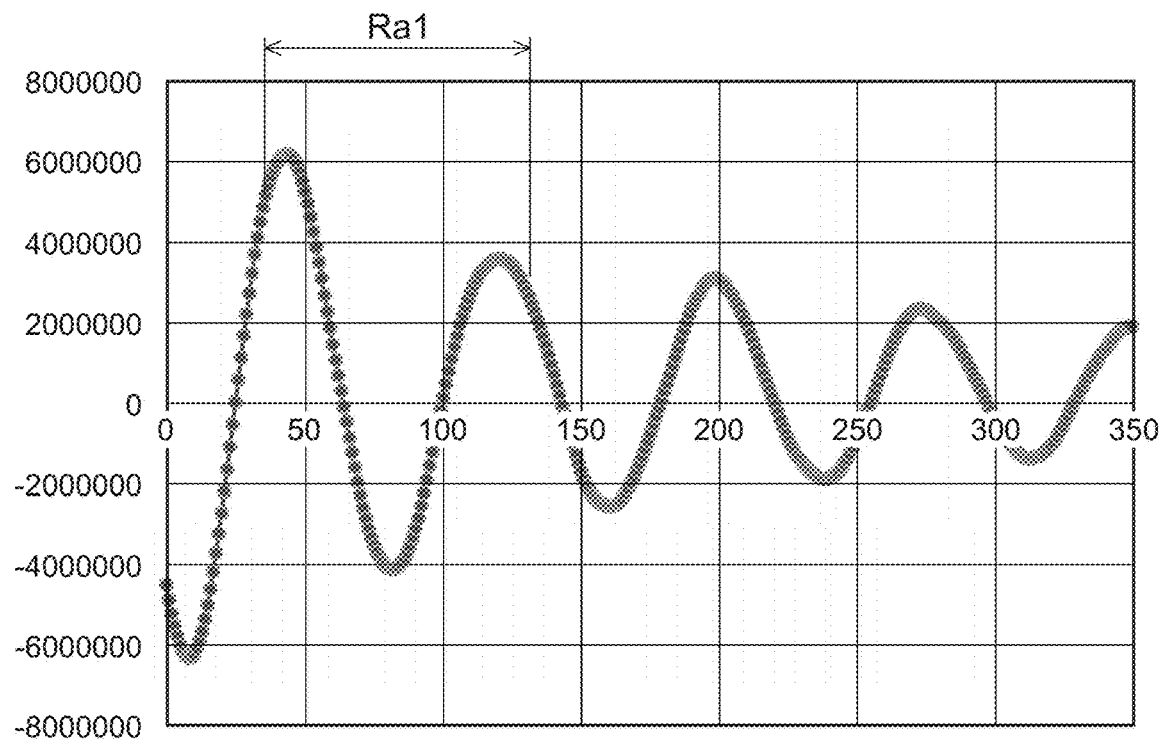
FIG. 15 is a graph illustrating the results of filtering the intensity distribution of the reflected waves.

FIG. 15 is a graph illustrating the results of filtering the intensity distribution of the reflected waves.

In FIG. 15, the horizontal axis is the position in the Z-direction, and the vertical axis is the intensity of the reflected wave. In the results of the filtering as illustrated in FIG. 15, only the components reflected by the upper surface and the lower surface of the weld portion are extracted.

The processing device 110 estimates the range of the weld portion in the Z-direction based on the extraction results. For example, the processing device 110 detects peaks included in the extraction results. The processing device 110 detects the position in the Z-direction of a first peak and the position in the Z-direction of a second peak. For example, the processing device 110 uses these positions as a reference to estimate a range Ra1 illustrated in FIG. 15 as the range of the weld portion in the Z-direction.

There are cases where the sign (positive or negative) of the reflected wave intensity from the upper surface of the weld portion and the sign of the reflected wave intensity from the lower surface of the weld portion are mutually reversed due to the structure of the weld portion, the configuration of the element array 131, etc. In such a case, the processing device 110 may detect a peak of one of positive or negative and another peak of the other of positive or negative. The processing device 110 uses the positions of these peaks as references to estimate the range of the weld portion in the Z-direction. According to the processing of the reflected wave intensity, there are cases where the reflected wave intensity has only positive values or negative values. In such a case, the range of the weld portion in the Z-direction may be estimated based on the positions of the multiple peaks, may be estimated based on the positions of the peak and the bottom, or may be estimated based on the positions of multiple bottoms. In other words, the processing device 110 uses the reflected wave intensity after the filtering to estimate the range of the weld portion in the Z-direction based on the positions of multiple extrema.

When the intensity distribution of the reflected waves is generated for each of the X-Z cross section and the Y-Z cross section, the range in the Z-direction based on the intensity distribution in the X-Z cross section and the range in the Z-direction based on the intensity distribution in the Y-Z cross section are estimated. For example, the processing device 110 calculates the average, the weighted average, the weighted moving average, or the like of the multiple estimation results and estimates the calculation result to be the range of the entire weld portion in the Z-direction.

Or, the processing device 110 may estimate the range of the weld portion in the Z-direction based on the intensity distribution of the reflected waves for one of the X-Z cross section or the Y-Z cross section and use the estimation result as the range of the entire weld portion in the Z-direction. The processing device 110 may estimate the range of the weld portion in the Z-direction based on the intensity distribution of the reflected waves for a portion in the X-direction and a portion in the Y-direction and use the estimation result as the range of the entire weld portion in the Z-direction. The calculation amount necessary for the generation of the intensity distribution of the reflected waves can be reduced by such processing.

In the example of FIG. 15, the position in the Z-direction of the lower limit of the range Ra1 is set to a value of a prescribed value subtracted from the position in the Z-direction of the first peak. The position in the Z-direction of the upper limit of the range Ra1 is set to a value of a prescribed value added to the position in the Z-direction of the second peak. Thereby, the second peak can be suppressed from being outside the range in the Z-direction of the weld portion at some point in the X-Y plane if the upper surface and the lower surface of the weld portion are tilted with respect to the arrangement direction of the detection elements 132.

After estimating the range of the weld portion in the Z-direction, the processing device 110 estimates the range of the weld portion in the X-direction and the range of the weld portion in the Y-direction.

Figure 16:
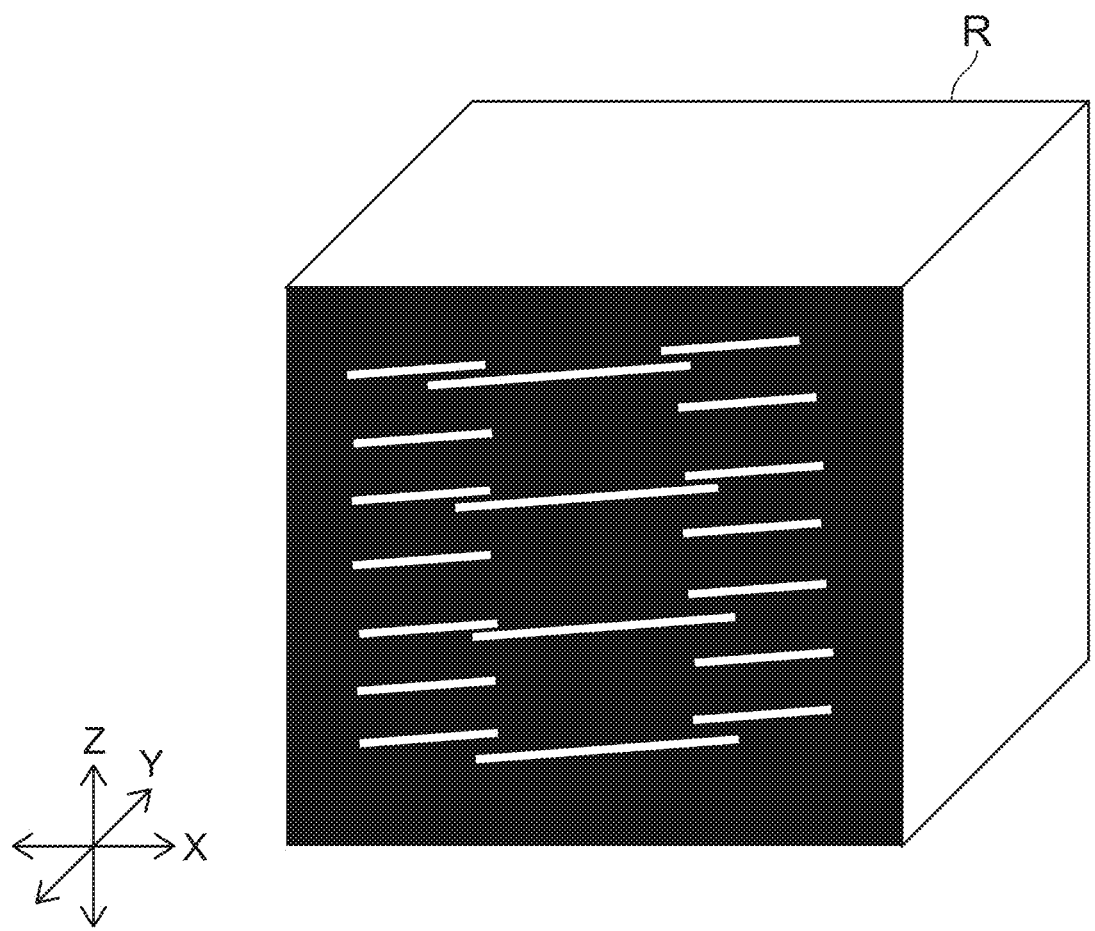
FIG. 16 is a schematic view illustrating the detection result of the reflected waves.
Figure 18:
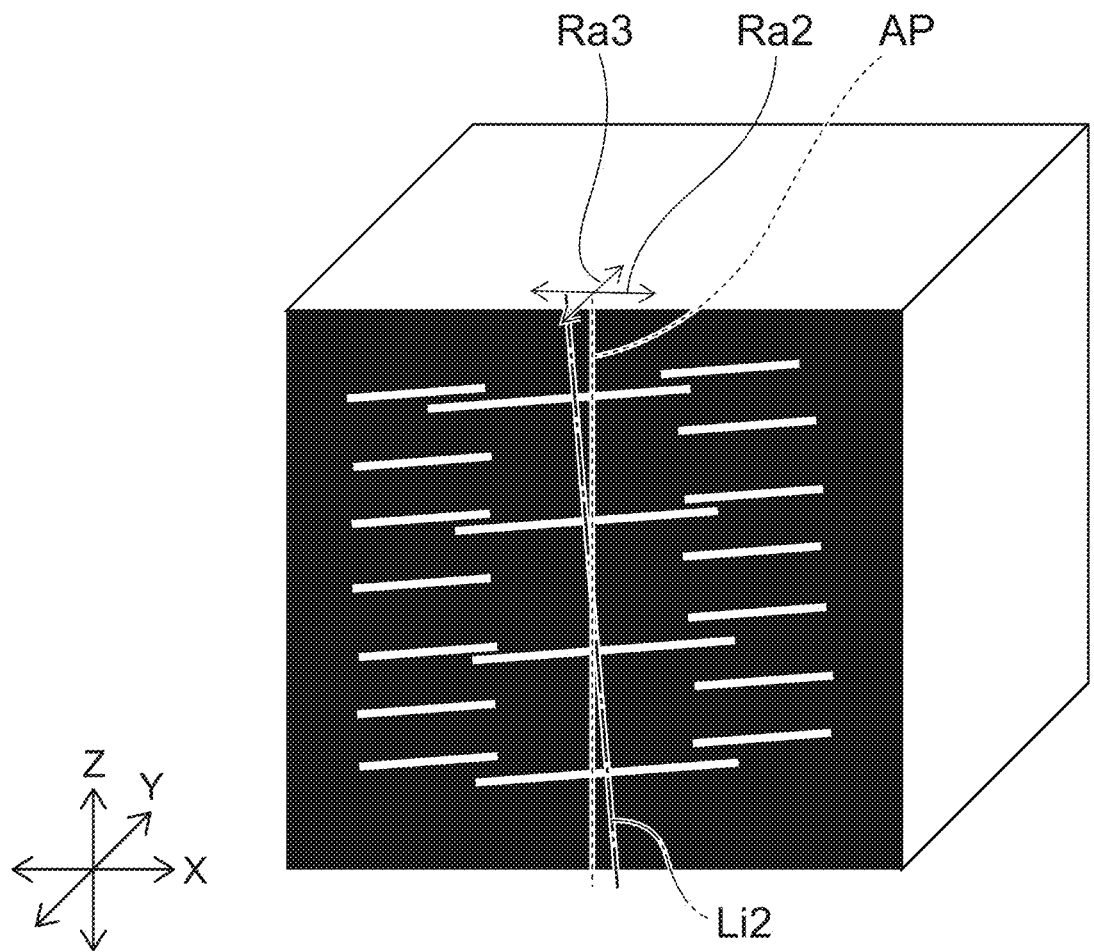
FIG. 18 is a schematic view illustrating the detection result of the reflected waves.

FIGS. 16 and 18 are schematic views illustrating the detection result of the reflected waves.

In FIGS. 16 and 18, a region R is the entire region in which the detection result of the reflected waves is obtained by the element array 131. One cross section of the region R includes the components of the reflected waves of the upper surface and the lower surface of the weld portion and the components of the reflected waves of the upper surface and the lower surface of the other portions.

The processing device 110 generates the intensity distribution of the reflected waves in the X-Y plane for points in the Z-direction. The processing device 110 may generate the intensity distribution within a preset range in the Z-direction. The calculation amount can be reduced thereby. Or, the processing device 110 may generate the intensity distribution within the estimated range in the Z-direction. Thereby, the reflected wave component being outside the lower surface of the weld portion when generating the intensity distribution of the reflected waves in the X-Y plane can be suppressed while reducing the calculation amount.

Figure 17A:
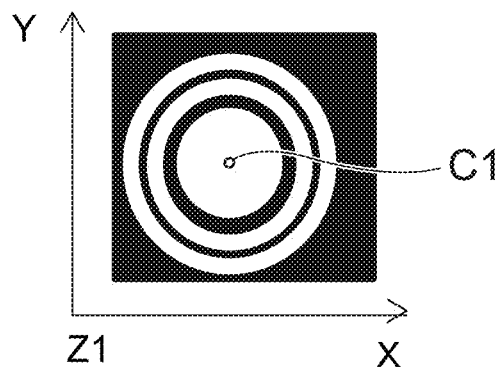
FIG. 17 is examples of the intensity distribution of the reflected waves in the X-Y plane.
Figure 17B:
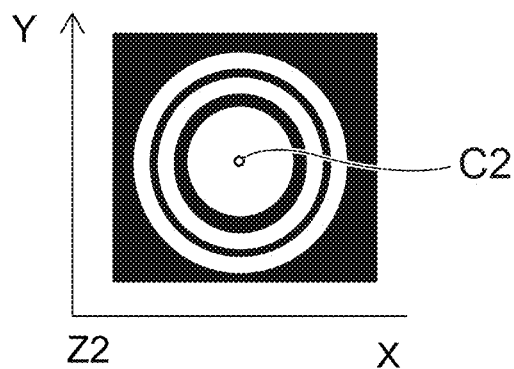
Figure 17C:
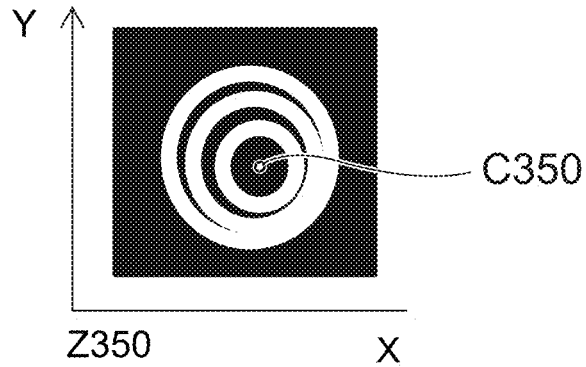

FIGS. 17A to 17C are examples of the intensity distribution of the reflected waves in the X-Y plane. FIG. 17A illustrates the intensity distribution of the reflected waves in the X-Y plane at the coordinate of Z=1. FIG. 17B illustrates the intensity distribution of the reflected waves in the X-Y plane at the coordinate of Z=2. FIG. 17C illustrates the intensity distribution of the reflected waves in the X-Y plane at the coordinate of Z=350. The binarized intensity of the reflected wave is schematically illustrated in FIG. 16, FIGS. 17A to 17C, and FIG. 18.

The processing device 110 calculates the centroid position of the intensity distribution of the reflected waves in the X-Y plane for the points in the Z-direction. Here, the centroid position of the intensity distribution is obtained by calculating the centroid position of an image of the intensity distribution. For example, as illustrated in FIGS. 17A to 17C, the processing device 110 calculates centroid positions C1 to C350 of the images. FIG. 18 illustrates the results of a line segment Li2 connecting all of the centroid positions from Z=0 to Z=350.

The processing device 110 averages the centroid positions from Z=0 to Z=350. The average position of the centroids in the X-direction and the average position of the centroids in the Y-direction are obtained thereby. In FIG. 18, an average position AP illustrates the average position of the centroids in the X-direction and the average position of the centroids in the Y-direction. The processing device 110 uses prescribed ranges in the X-direction and the Y-direction with the average position AP at the center as a range Ra2 of the weld portion in the X-direction and a range Ra3 of the weld portion in the Y-direction.

For example, a value V that indicates the diameter of the detector 130 (the element array 131) is preset to estimate the range Ra2 and the range Ra3. The processing device 110 uses AP−V/2 to AP+V/2 in the X-direction and the Y-direction respectively as the range Ra2 and the range Ra3. In such a case, the estimated range in the X-Y plane is quadrilateral. The estimated range is not limited to the example; the estimated range in the X-Y plane may have a five-or-higher-sided polygonal shape, a circular shape, etc. The shape of the estimated range in the X-Y plane is modifiable as appropriate according to the shape of the weld portion.

The range Ra2 and the range Ra3 may be determined using another value based on the value V. Instead of the value indicating the diameter of the detector 130, a value that indicates the average diameter of the weld portion may be preset. This is because the diameter of the weld portion corresponds to the diameter of the detector 130. The value that indicates the diameter of the weld portion can be considered to be a value that substantially indicates the diameter of the detector 130.

The range Ra1 in the Z-direction, the range Ra2 in the X-direction, and the range Ra3 in the Y-direction of the weld portion are estimated by the processing described above. After the ranges are estimated, step S12 illustrated in FIG. 12 is performed based on the detection result of the reflected waves in the estimated ranges.

Figure 19:
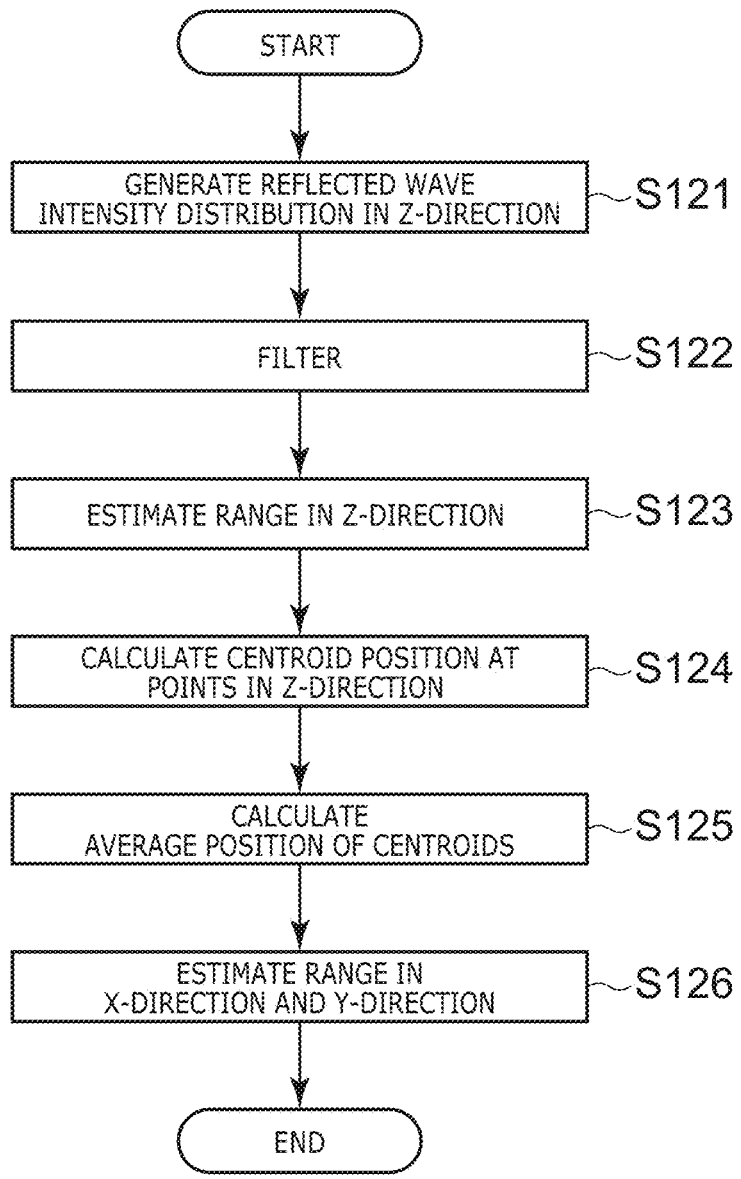
FIG. 19 is a flowchart illustrating the flow of the estimation of the range of the processing system according to the embodiment.

FIG. 19 is a flowchart illustrating the flow of the estimation of the range of the processing system according to the embodiment.

The processing device 110 generates the intensity distribution of the reflected waves in the Z-direction based on the detection result of the reflected waves by the detector 130 (step S121). The processing device 110 filters the intensity distribution based on a value of the thickness of the weld portion (step S122). Thereby, only the reflected wave components of the weld portion 13 are extracted from the intensity distribution. Based on the extraction results, the processing device 110 estimates the range of the weld portion in the Z-direction (step S123). The processing device 110 calculates the centroid position of the reflected wave intensity in the X-Y plane for points in the Z-direction (step S124). The processing device 110 calculates the average position by averaging the multiple calculated centroid positions (step S125). Based on the average position and the diameter of the detector 130, the processing device 110 estimates the range in each of the X-direction and the Y-direction (step S126).

The estimation of the range in the Z-direction may be performed after estimating the ranges in the X-direction and the Y-direction. For example, steps S121 to S123 may be performed after steps S124 to S126 in the flowchart illustrated in FIG. 19. In such a case, the processing device 110 may calculate the intensity distribution of the reflected waves in the Z-direction within the estimated ranges in the X-direction and the Y-direction. The calculation amount can be reduced thereby.

(Tilt Calculation)

Figure 20:
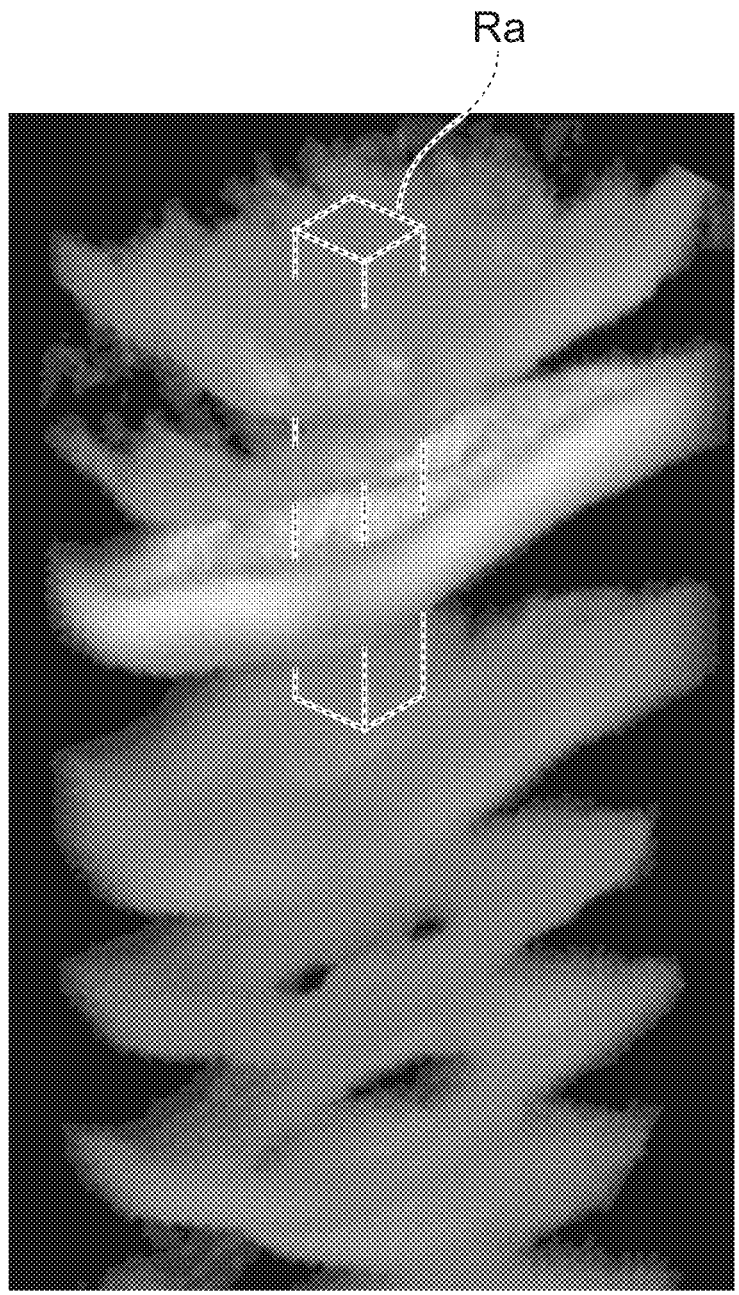
FIG. 20 is an image illustrating the detection result of the reflected waves.
Figure 20:
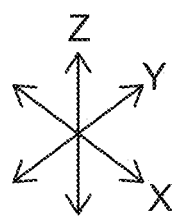

FIG. 20 is an image illustrating the detection result of the reflected waves.

In FIG. 20, whiter colors show that the intensity of the reflected wave is greater at that point. The processing device 110 performs the operation illustrated in FIG. 21 for the detection result illustrated in FIG. 20. As a result, a range Ra is estimated.

One specific example of a method for calculating the tilt in the range Ra will now be described.

Figure 21:
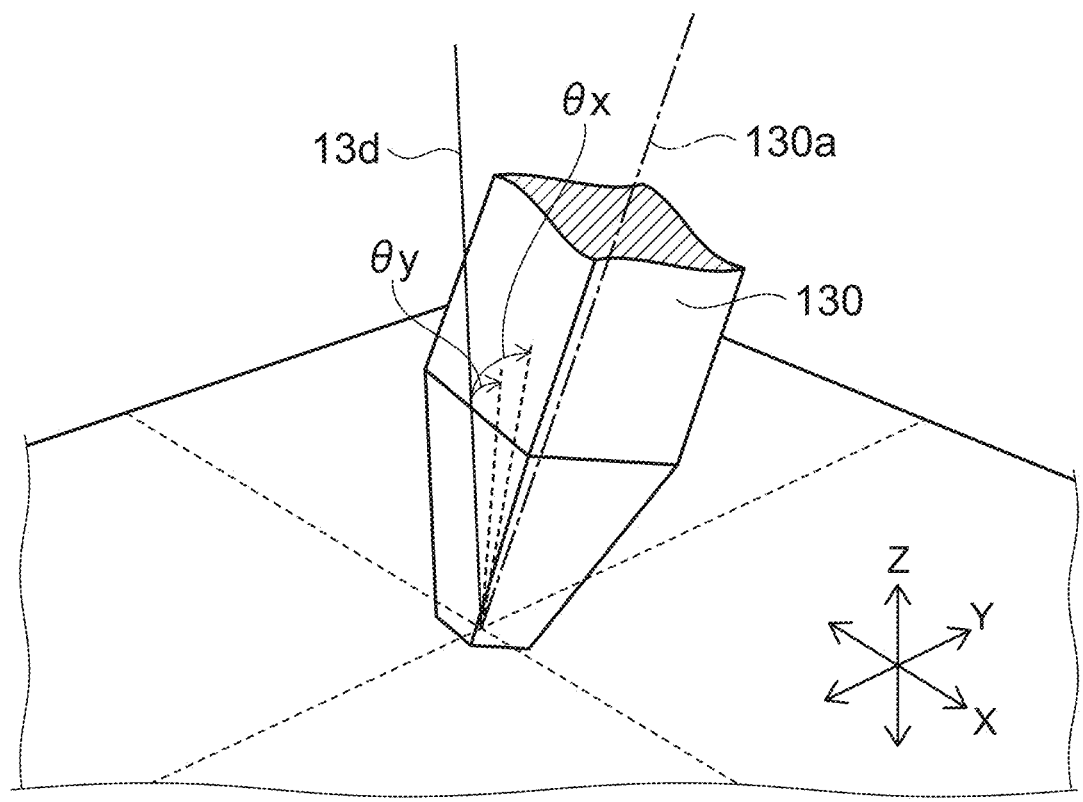
FIG. 21 is a drawing for describing the processing according to the processing system according to the embodiment.

FIG. 21 is a drawing for describing the processing according to the processing system according to the embodiment.

FIG. 22 is an example of an image obtained by the processing system according to the embodiment.

Figure 22A:
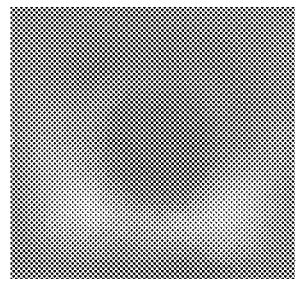
FIG. 22 is examples of images obtained by the processing system according to the embodiment.
Figure 22B:
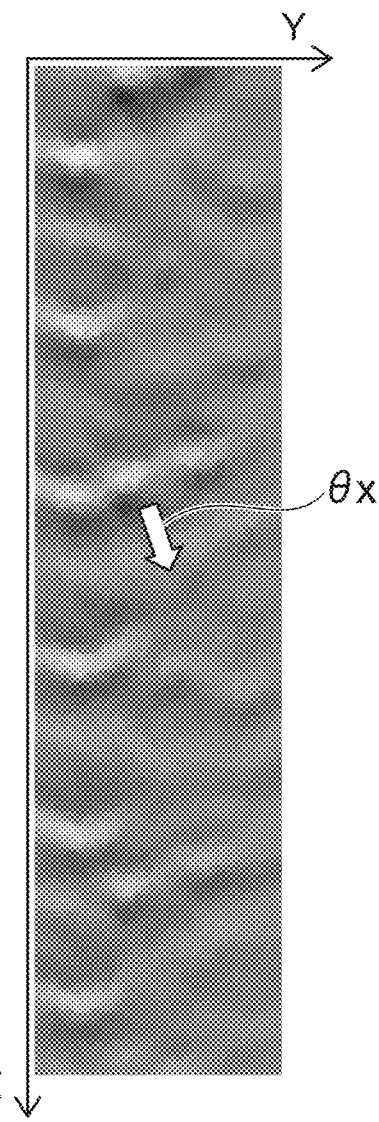
Figure 22C:
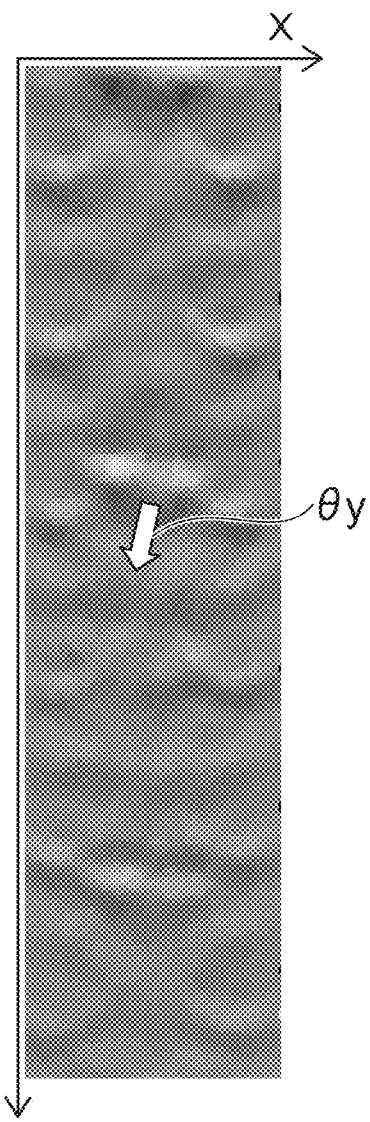

FIG. 22A illustrates the surface of the weld portion 13 in the volume data illustrated in FIG. 5. FIG. 22B illustrates the Y-Z cross section at the weld portion 13 vicinity in the volume data illustrated in FIG. 5. FIG. 22C illustrates the X-Z cross section at the weld portion 13 vicinity in the volume data illustrated in FIG. 5. In FIGS. 22B and 22C, the upper side is the surface of the weld portion; and the data downward in the depth direction is shown. The portions at which the luminance is high are portions at which the reflection intensity of the ultrasonic wave is large. The ultrasonic wave is intensely reflected by the bottom surface of the weld portion 13, a surface between the members not joined to each other, etc.

The tilt of the detector 130 corresponds to the angle between a direction 13$d$ perpendicular to the weld portion 13 and a direction 130$a$ of the detector 130 illustrated in FIG. 21. This angle is expressed as an angle θx around the X-direction and an angle θy around the Y-direction. The direction 130$a$ of the detector 130 is perpendicular to the arrangement direction of the detection elements 132.

The angle θx is calculated based on the detection result in the Y-Z cross section as illustrated in FIG. 22B. The angle θy is calculated based on the detection result in the X-Z cross section as illustrated in FIG. 22C. The processing device 110 calculates the average of the three-dimensional luminance gradients in the cross sections as the angles θx and θy. The processing device 110 stores the calculated angles θx and θy in the memory device 120 as the tilt of the detector 130. The processing device 110 may cause the display device 150 to display the calculated tilt.

By calculating the tilt of the detector 130 and by reducing the tilt, it can be determined with higher accuracy whether or not the points are joined in the first determination. The accuracy of the data based on the result of the first determination can be increased. By estimating the range in which the calculation of the tilt and the first determination are performed, the calculation amount necessary for the processing can be reduced.

For example, the detector 130 is used to re-perform the probe when the result of the first determination is determined to be inappropriate in the second determination. At this time, a condition when re-performing the probe may be different from a condition when performing the directly-previous probe. For example, the condition when re-performing the probe is changed from the condition when performing the directly-previous probe by performing at least one of re-coating the couplant, readjusting the tilt, or modifying the tolerance range of the tilt.

For example, when the result of the first determination is determined to be inappropriate, the user separates the detector 130 from the welding object and re-coats the couplant onto the welding object. If the couplant was not filled between the welding object and the detector 130 in the directly-previous probe, there is a possibility that the couplant may be filled between the welding object and the detector 130 by re-coating the couplant. When re-coating the couplant, the couplant that is already coated onto the welding object may be removed.

In the re-probing, the tilt of the detector 130 with respect to the welding object may be set to the same value as the tilt of the directly-previous probe. Even when the tilt of the detector 130 has the same value as the directly-previous tilt, there is a possibility that the detection result of the reflected waves may be different from the directly-previous detection result. By setting the tilt of the detector 130 to have the same value as the directly-previous tilt, the tilt is maintained within the tolerance range.

Or, the tilt of the detector 130 with respect to the welding object may be set to a value that is different from the tilt of the directly-previous probe. In such a case, it is favorable for the change amount of the tilt to be less than the difference between the directly-previous tilt and the critical value of the tolerance range. Even when the tilt of the detector 130 is changed, the tilt after the change being outside the tolerance range can be suppressed thereby. By changing the tilt of the detector 130, the likelihood of obtaining a detection result that is different from the directly-previous detection result of the reflected wave increases.

The tilt of the detector 130 may be set outside the tolerance range. Thereby, the tilt of the detector 130 is set to a value that is much different from the tilt of the directly-previous probe. As a result, the likelihood of obtaining a detection result that is much different from the directly-previous probe increases. By re-adjusting the tilt of the detector 130 based on the detection result that is much different from the directly-previous probe, there is a possibility that the detector 130 can be adjusted to a state in which a more appropriate detection result is obtained.

The tolerance range of the tilt may be modified in the re-probing. For example, the processing device 110 narrows the tolerance range of the tilt. The processing device 110 adjusts the tilt of the detector 130 so that the tilt is within the narrowed tolerance range. When modifying the tolerance range, the processing device 110 may set the tilt of the detector 130 to a value that is different from the tilt of the directly-previous probe.

After re-probing using a condition that is different from when performing the directly-previous probe, the first determination is re-performed based on the detection result of the reflected waves obtained by the probing. Or, the estimation of the range may be re-performed before the first determination. In the first determination, the joint or the non-joint is detected for points in the re-estimated range.

When the result of the first determination is determined to be inappropriate and re-probing using the detector 130 is performed, a condition when probing may be changed according to the determination result of the goodness of the weld. For example, when the weld is determined to be good and the result of the first determination is determined to be inappropriate, at least one of re-coating the couplant, readjusting the tilt, or modifying the tolerance range of the tilt is performed. Thereby, the condition when re-performing the probe is changed from the condition when performing the directly-previous probe to another condition (a first condition). When the weld is determined to be defective and the result of the first determination is determined to be inappropriate, another at least one of re-coating the couplant, readjusting the tilt, or modifying the tolerance range of the tilt is performed. Thereby, the condition when re-performing the probe is changed from the condition when performing the directly-previous probe to yet another condition (a second condition). By setting the condition when probing according to the combination of the result of the first determination and the determination result of the weld, a more appropriate detection result of the reflected waves in the re-probing is easily obtained.

FIG. 23 is schematic views illustrating results of classifications using the first model.

Figure 23A:
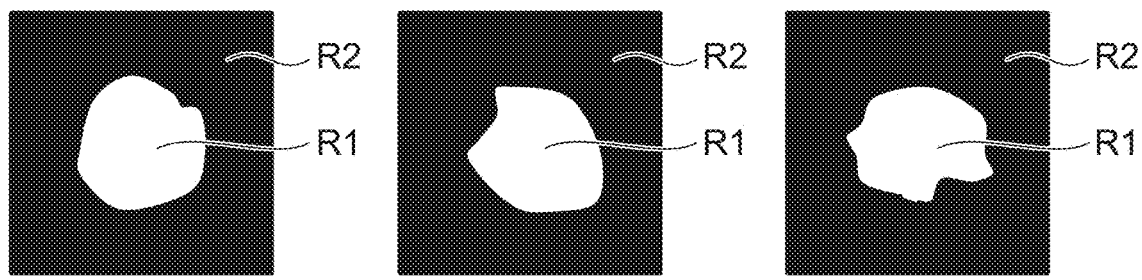
FIG. 23 is schematic views illustrating results of classification by a first model.
Figure 23B:
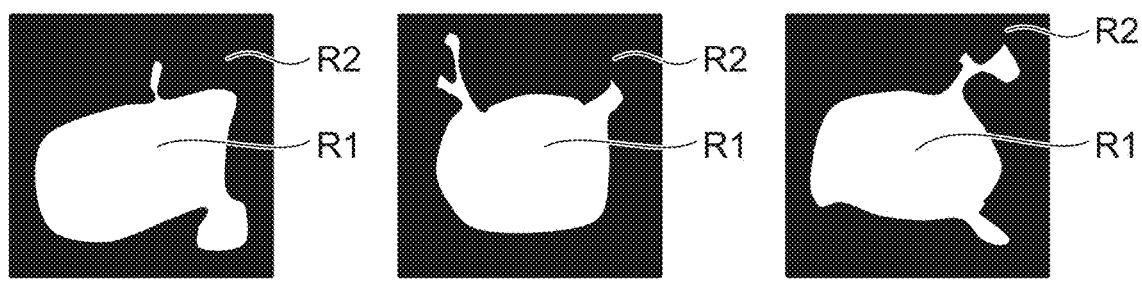
Figure 23C:
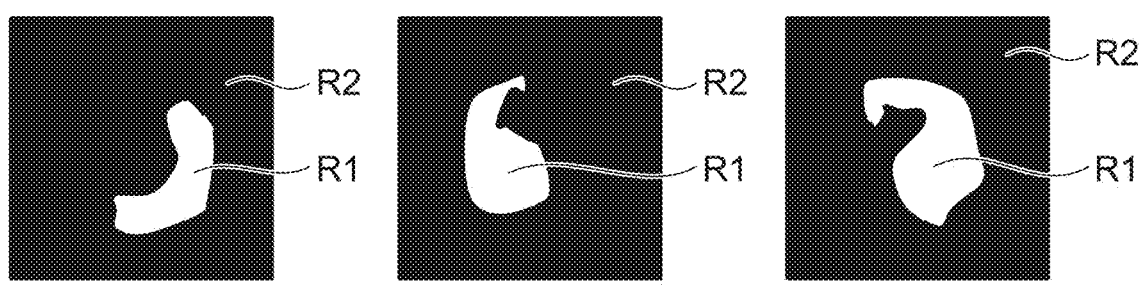

In the second method of the second determination, the detection result of the reflected waves or the result of the first determination may be classified as three or more categories by the first model. FIGS. 23A to 23C show examples in which image data of the result of the first determination is classified as three or more categories by the first model.

FIGS. 23A to 23C respectively illustrate image data classified as mutually-different categories. The image data illustrated in FIG. 23A shows that the result of the first determination is appropriate. The image data illustrated in FIGS. 23B and 23C shows that the result of the first determination is inappropriate.

The surface area of the first region R1 of the image data of FIG. 23B is large compared to the image data of FIG. 23A. A portion of the first region R1 protrudes in the image data of FIG. 23B. The image data of FIG. 23B is classified as the second category that is different from the first category in which the image data of FIG. 23A is classified. The surface area of the first region R1 of the image data of FIG. 23C is small compared to the image data of FIG. 23A. The first region R1 is curved over the entirety in the image data of FIG. 23C. The image data of FIG. 23C is classified as a third category that is different from the first and second categories. The shape of the first region R1 in the image data of FIGS. 23B and 23C is unlike a circle compared to the image data of FIG. 23A.

Instead of the image data of the result of the first determination, three-dimensional volume data of the detection result of the reflected waves may be input to the first model. The image data of the result of the first determination is based on the detection result of the reflected waves. Accordingly, the three-dimensional volume data can similarly be classified as one of multiple categories by the first model.

For example, when the result of the first determination is determined to be inappropriate, re-probing using the detector 130 is performed. At this time, the condition when probing may be changed according to the category in which the data is classified. For example, when the data is classified as the second category, at least one of re-coating the couplant, readjusting the tilt, or modifying the tolerance range of the tilt is performed. Thereby, the condition when re-performing the probe is changed from the condition when performing the directly-previous probe to another condition (the first condition). When the data is classified as the third category, another at least one of re-coating the couplant, readjusting the tilt, or modifying the tolerance range of the tilt is performed. Thereby, the condition when re-performing the probe is changed from the condition when performing the directly-previous probe to yet another condition (the second condition). By setting the condition when probing according to the category in which the data is classified, a more appropriate detection result of the reflected waves in the re-probing is easily obtained.

(Modifications)

The inspection of the weld portion described above may be automatically performed by a robot.

Figure 24:
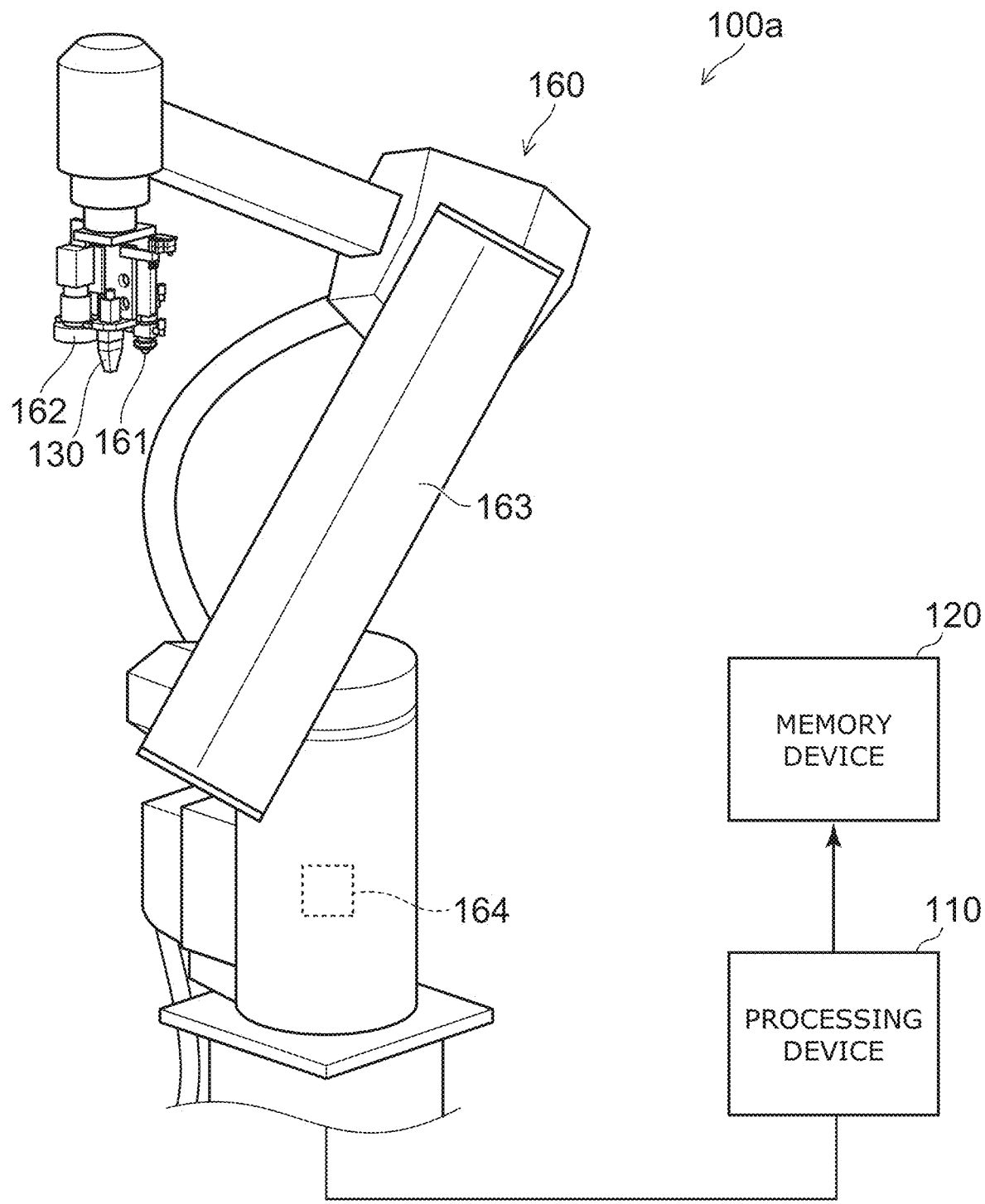
FIG. 24 is a schematic view illustrating a configuration of a processing system according to a modification of the embodiment.

FIG. 24 is a schematic view illustrating a configuration of a processing system according to a modification of the embodiment.

Figure 25:
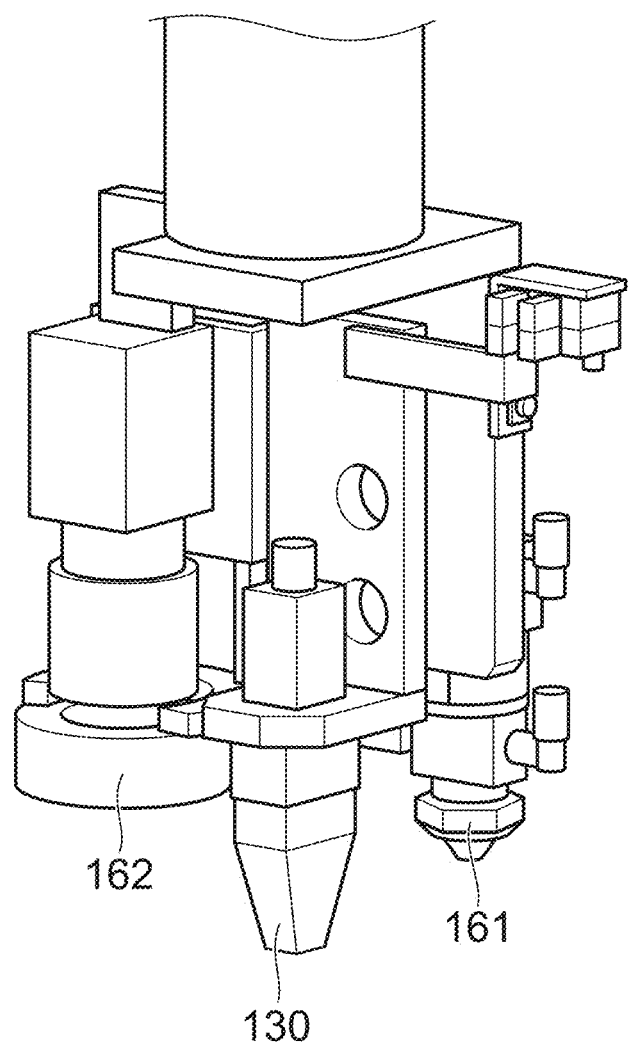
FIG. 25 is a perspective view illustrating a portion of the processing system according to the modification of the embodiment.

FIG. 25 is a perspective view illustrating a portion of the processing system according to the modification of the embodiment.

The processing system 100a illustrated in FIG. 24 includes the processing device 110 and a robot 160. The robot 160 includes the detector 130, an imaging device 161, a coating device 162, an arm 163, and a control device 164.

The imaging device 161 acquires an image by imaging the welded members. The imaging device 161 extracts a weld mark from the image and detects roughly the position of the weld portion 13. The coating device 162 coats a couplant onto the upper surface of the weld portion 13.

The detector 130, the imaging device 161, and the coating device 162 are located at the distal end of the arm 163 as illustrated in FIG. 25. The arm 163 is, for example, an articulated robot. The detector 130, the imaging device 161, and the coating device 162 can be displaced by driving the arm 163. The control device 164 controls the operations of the components (the detector 130, the imaging device 161, the coating device 162, and the arm 163) of the robot 160.

Figure 26:
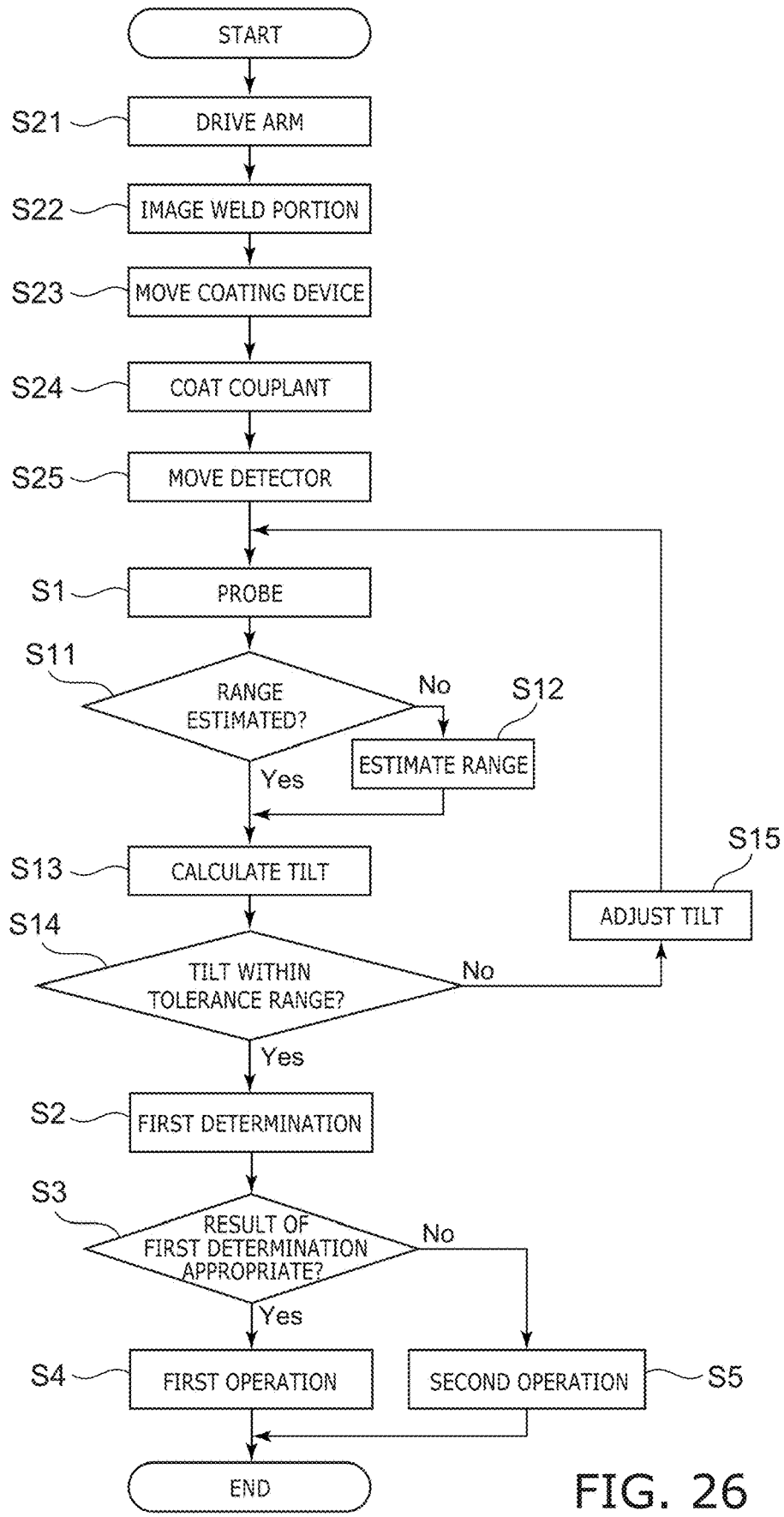
FIG. 26 is a flowchart illustrating an operation of the processing system according to the modification of the embodiment.

FIG. 26 is a flowchart illustrating an operation of the processing system according to the modification of the embodiment.

The processing device 110 transmits the coordinates of the weld portion 13 stored in the memory device 120 to the control device 164. The control device 164 moves the distal end of the arm 163 toward the received coordinates by driving the arm 163 (step S21). When the detector 130 is moved to the vicinity of the received coordinates, the imaging device 161 images the member 10; and the detailed position of the weld portion 13 is detected using the acquired image (step S22). The control device 164 moves the coating device 162 to the vicinity of the detected position by driving the arm 163 (step S23). The coating device 162 coats the couplant onto the weld portion 13 (step S24). The control device 164 drives the arm 163 and moves the detector 130 so that the tip of the detector 130 contacts the weld portion 13 coated with the couplant (step S25). Thereafter, S1 to S5 and S11 to S15 are performed similarly to the flowchart illustrated in FIG. 12.

The probing of step S2 may be re-performed in the second operation of step S5. For example, when the result of the first determination is determined to be inappropriate in step S3, the processing device 110 transmits the determination result to the control device 164. When the determination result is received, the control device 164 re-performs the probe using the detector 130. At this time, the control device 164 may perform at least one of re-coating the couplant, readjusting the tilt, or modifying the tolerance range of the tilt.

In the re-probing, the control device 164 may set the tilt of the detector 130 with respect to the welding object to the same value as the tilt of the directly-previous probe. Even when the tilt of the detector 130 has the same value as the directly-previous tilt, there is a possibility that the detection result of the reflected waves may be different from the directly-previous detection result. By setting the tilt of the detector 130 to the same value as the directly-previous tilt, the tilt is maintained within the tolerance range.

Or, the control device 164 may set the tilt of the detector 130 with respect to the welding object to a value that is different from the tilt of the directly-previous probe. In such a case, it is favorable for the change amount of the tilt to be less than the difference between the directly-previous tilt and the critical value of the tolerance range. Even when the tilt of the detector 130 is changed, the tilt after the change being outside the tolerance range can be suppressed thereby. By changing the tilt of the detector 130, the likelihood of obtaining a detection result that is different from the directly-previous detection result of the reflected wave increases.

When the tilt of the detector 130 is set to a value that is different from the tilt of the directly-previous probe, the control device 164 may set the tilt of the detector 130 to be outside the tolerance range. Thereby, the tilt of the detector 130 is set to a value that is much different from the tilt of the directly-previous probe. As a result, the likelihood of obtaining a detection result that is much different from the directly-previous probe increases. By re-adjusting the tilt of the detector 130 based on the detection result that is much different from the directly-previous probe, there is a possibility that the detector 130 can be controlled to a state in which a more appropriate detection result is obtained.

The control device 164 may re-perform step S22 or S24. In other words, the control device 164 re-detects the position of the weld portion 13. There is a possibility that a more accurate position of the weld portion 13 may be detected thereby, and a more appropriate result of the first determination may be obtained. Or, the control device 164 re-coats the couplant onto the weld portion 13. For example, when the result of the first determination is determined to be inappropriate, the control device 164 separates the detector 130 from the welding object by driving the arm 163. The control device 164 causes the coating device 162 to re-coat the couplant onto the welding object. The control device 164 may clean the nozzle of the coating device 162 before coating the couplant. As a test before coating the couplant, the control device 164 may dispense the couplant onto a position separated from the welding object to determine whether or not the couplant is correctly dispensed. The control device 164 may clean the nozzle of the coating device 162 when the couplant is not correctly dispensed. When the coating device 162 has an abnormality, there is a possibility that the abnormality of the coating device 162 may be eliminated by these operations. After the cleaning or the test dispensing, the control device 164 re-coats the couplant onto the welding object. By re-coating the couplant, there is a possibility that the couplant may fill between the welding object and the detector 130. As a result, there is a possibility that a more appropriate result of the first determination may be obtained. After performing step S22 or S24, the subsequent steps are re-performed.

When the result of the first determination is determined to be inappropriate and when the re-probing is performed using the detector 130, the control device 164 may change the condition when probing according to the determination result of the goodness of the weld. For example, when the weld is determined to be good and the result of the first determination is determined to be inappropriate, the control device 164 performs at least one of re-coating the couplant, readjusting the tilt, or modifying the tolerance range of the tilt. Thereby, the condition when re-performing the probe is changed from the condition when performing the directly-previous probe to another condition (the first condition). When the weld is determined to be defective and the result of the first determination is determined to be inappropriate, the control device 164 performs another at least one of re-coating the couplant, readjusting the tilt, or modifying the tolerance range of the tilt. Thereby, the condition when re-performing the probe is changed from the condition when performing the directly-previous probe to yet another condition (the second condition). By setting the condition when probing according to the combination of the result of the first determination and the determination result of the weld, a more appropriate detection result of the reflected waves in the re-probing is easily obtained.

When the second method is used in the second determination, the control device 164 may change the condition when probing according to the category in which the data is classified. For example, when the data is classified as the second category, the control device 164 performs at least one of re-coating the couplant, readjusting the tilt, or modifying the tolerance range of the tilt. Thereby, the condition when re-performing the probe is changed from the condition when performing the directly-previous probe to another condition (the first condition). When the data is classified as the third category, the control device 164 performs another at least one of re-coating the couplant, readjusting the tilt, or modifying the tolerance range of the tilt. Thereby, the condition when re-performing the probe is changed from the condition when performing the directly-previous probe to yet another condition (the second condition). By setting the condition when probing according to the category in which the data is classified, a more appropriate detection result of the reflected waves in the re-probing is easily obtained.

By performing the second determination in the processing system 100a, more accurate data related to the welding object can be obtained. For example, when the surface area or the diameter of the weld portion 13 is calculated based on the result of the first determination, a more accurate value can be obtained by employing a value based on the result of the first determination determined to be appropriate.

Figure 27:
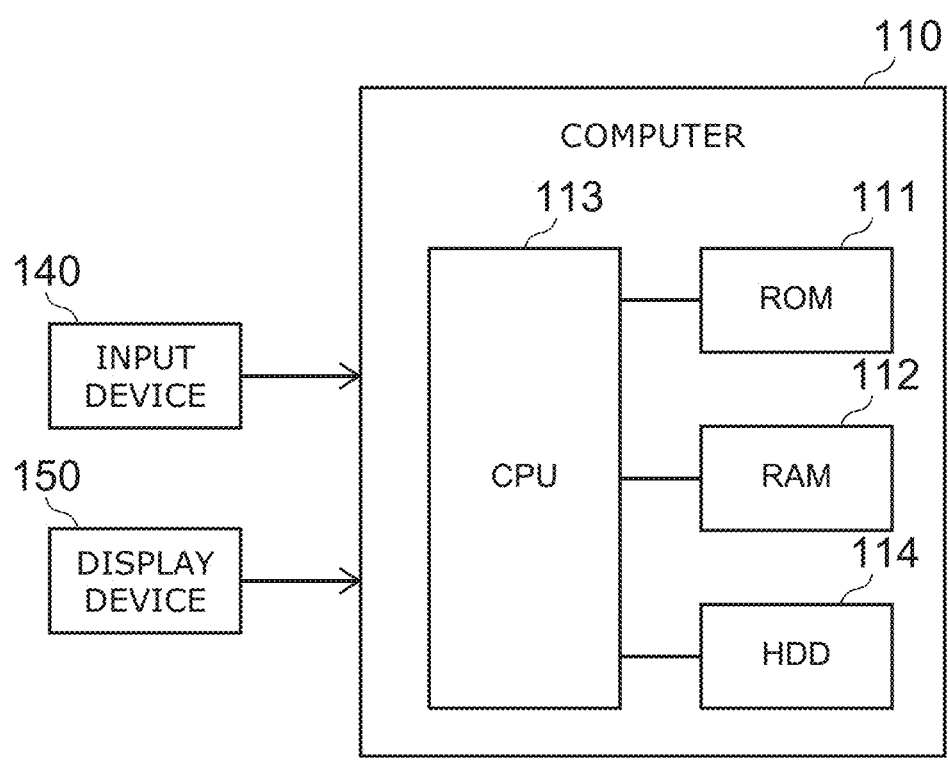
FIG. 27 is a block diagram illustrating a hardware configuration of the system.

FIG. 27 is a block diagram illustrating a hardware configuration of the system.

For example, the processing device 110 of the processing system 100 according to the embodiment is a computer and includes ROM (Read Only Memory) 111, RAM (Random Access Memory) 112, a CPU (Central Processing Unit) 113, and a HDD (Hard Disk Drive) 114.

The ROM 111 stores programs controlling the operations of the computer. The ROM 111 stores programs necessary for causing the computer to realize the processing described above.

The RAM 112 functions as a memory region where the programs stored in the ROM 111 are loaded. The CPU 113 includes a processing circuit. The CPU 113 reads a control program stored in the ROM 111 and controls the operation of the computer according to the control program. The CPU 113 loads various data obtained by the operation of the computer into the RAM 112. The HDD 114 stores data necessary for reading and/or data obtained in the reading process. For example, the HDD 114 functions as the memory device 120 illustrated in FIG. 1.

Instead of the HDD 114, the processing device 110 may include an eMMC (embedded Multi Media Card), a SSD (Solid State Drive), a SSHD (Solid State Hybrid Drive), etc.

The input device 140 includes at least one of a mouse, a keyboard, or a touchpad. The display device 150 includes at least one of a monitor or a projector. A device such as a touch panel that functions as both the input device 140 and the display device 150 may be used.

The hardware configuration illustrated in FIG. 27 is applicable to the control device 164 as well. Or, one computer illustrated in FIG. 27 may function as the processing device 110 and the control device 164. Or, the function of the processing device 110 or the control device 164 may be realized by the collaboration of multiple computers.

A case is described in the examples described above where the average shape of the weld portion 13 is circular. The second determination described above is applicable even when the shape of the weld portion 13 is not a circle. For example, the processing device 110 extracts the outer edge of the first region R1 after setting the first region R1 based on the result of the first determination. The processing device 110 may determine the appropriateness of the result of the first determination based on the similarity of the outer edge of the first region R1 with a preset shape. For example, the processing device 110 calculates the similarity between an image of the outer edge of the first region R1 and an image that includes the preset shape. The similarity is calculated based on feature points of the images, etc. The processing device 110 determines the appropriateness of the result of the first determination by comparing the similarity to a preset threshold.

By using the processing system and the processing method according to embodiments described above, more accurate data related to the welding object can be obtained.

Similar effects can be obtained by using a program for causing a computer to operate as the processing system.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), a non-transitory tangible recording medium (a non-transitory computer-readable storage medium) such as semiconductor memory, etc.

For example, the data that is recorded in the recording medium can be read by a computer (or an embedded system). The recording format (the storage format) of the recording medium is arbitrary. For example, the computer reads the program from the recording medium and causes the CPU to execute the instructions recited in the program based on the program. In the computer, the acquisition (or the reading) of the program may be performed via a network.

While certain embodiments of the invention have been illustrated, these embodiments have been presented by way of example only, and are not intended to limit the scope of the inventions. These novel embodiments may be embodied in a variety of other forms; and various omissions, substitutions, modifications, etc., can be made without departing from the spirit of the inventions. These embodiments and their modifications are within the scope and spirit of the inventions, and are within the scope of the inventions described in the claims and their equivalents. Embodiments described above can be implemented in combination with each other.

What is claimed is:

1. A processing system, comprising:
a processing device that
receives a detection result of a reflected wave from a detector, the detector including a plurality of detection elements arranged in a first direction and a second direction, the first direction and the second direction crossing each other, the detector performing a probe that includes transmitting an ultrasonic wave toward a welding object and detecting the reflected wave,
performs a first determination of determining a joint and a non-joint at a plurality of points along the first and second directions of the welding object based on the detection result, and
performs a second determination of determining an appropriateness of a result of the first determination based on the detection result or the result of the first determination, wherein
in the second determination, the processing device:
calculates a first evaluation value based on the detection result or the result of the first determination; and
determines the appropriateness of the result of the first determination by using the first evaluation value and a previous first evaluation value.

2. The system according to claim 1, wherein
in the second determination, the processing device:
calculates a second evaluation value based on a plurality of the previous first evaluation values; and
determines the appropriateness of the result of the first determination by comparing a difference between the first evaluation value and the second evaluation value to a first threshold.

3. The system according to claim 1, further comprising:
the detector,
the detector re-performing the probe of the welding object when the processing device determines the result of the first determination to be inappropriate.

4. The system according to claim 2, wherein
the processing device determines a goodness of a weld of the welding object based on the result of the first determination,
when the processing device determines the weld to be good and determines the result of the first determination to be inappropriate, the detector re-performs the probe of the welding object by using a first condition, and
when the processing device determines the weld to be defective and determines the result of the first determination to be inappropriate, the detector re-performs the probe of the welding object by using a second condition.

5. The system according to claim 3, further comprising:
a coating device coating a couplant onto the welding object,
the detector contacting the welding object coated with the couplant.

6. The system according to claim 3, further comprising:
an arm, the detector being located at a distal end of the arm; and
a control device controlling the detector and the arm,
the control device causing the detector to contact the welding object by driving the arm.

7. The system according to claim 6, further comprising:
an imaging device,
the imaging device acquiring an image by imaging the welding object,
the control device detecting a position of a weld portion of the welding object based on the image, and causing the detector to contact the detected position.

8. The system according to claim 1, wherein
the processing device derives data related to the welding object based on the result of the first determination, and
the processing device employs the data when the result of the first determination is determined to be appropriate.

9. The system according to claim 8, wherein
the data includes at least one of a surface area of a weld portion, a diameter of the weld portion, or a determination result of a goodness of the weld of the welding object.

10. A processing system, comprising:
a processing device that
receives a detection result of a reflected wave from a detector, the detector including a plurality of detection elements arranged in a first direction and a second direction, the first direction and the second direction crossing each other, the detector performing a probe that includes transmitting an ultrasonic wave toward a welding object and detecting the reflected wave,
performs a first determination of determining a joint and a non-joint at a plurality of points along the first and second directions of the welding object based on the detection result, and
performs a second determination of determining an appropriateness of a result of the first determination based on the detection result or the result of the first determination, wherein in the second determination, the processing device:
- determines the result of the first determination to be appropriate when the detection result or the result of the first determination is classified as a first category by a first model; and
- determines the result of the first determination to be inappropriate when the detection result or the result of the first determination is classified as a second category by the first model.

11. The system according to claim 4, further comprising:
the detector,
the detector re-performs the probe of the welding object by using a first condition when the detection result or the result of the first determination is classified as the second category by the first model, and
the detector re-performs the probe of the welding object by using a second condition when the detection result or the result of the first determination is classified as a third category by the first model.

12. A processing method, comprising:
receiving a detection result of a reflected wave from a detector, the detector including a plurality of detection elements arranged in a first direction and a second direction, the first direction and the second direction crossing each other, the detector performing a probe that includes transmitting an ultrasonic wave toward a welding object and detecting the reflected wave;
performing a first determination of determining a joint and a non-joint at a plurality of points along the first and second directions of the welding object based on the detection result; and
performing a second determination of determining an appropriateness of a result of the first determination based on the detection result or the result of the first determination, wherein
the second determination includes calculating a first evaluation value based on the detection result or the result of the first determination, and determining the appropriateness of the result of the first determination by using the first evaluation value and a previous first evaluation value.

13. The method according to claim 12, wherein
the probe of the welding object is re-performed using the detector when the result of the first determination is determined to be inappropriate.

14. A processing method, comprising:
receiving a detection result of a reflected wave from a detector, the detector including a plurality of detection elements arranged in a first direction and a second direction, the first direction and the second direction crossing each other, the detector performing a probe that includes transmitting an ultrasonic wave toward a welding object and detecting the reflected wave;
performing a first determination of determining a joint and a non-joint at a plurality of points along the first and second directions of the welding object based on the detection result; and
performing a second determination of determining an appropriateness of a result of the first determination based on the detection result or the result of the first determination, wherein
the second determination includes
- determining the result of the first determination to be appropriate when the detection result or the result of the first determination is classified as a first category by a first model, and
- determining the result of the first determination to be inappropriate when the detection result or the result of the first determination is classified as a second category by the first model.

15. A non-transitory computer readable storage medium storing a program, the program causing a computer to perform the processing method according to claim 12.

16. A non-transitory computer readable storage medium storing a program, the program causing a computer to perform the processing method according to claim 14.

* * * * *